US009632789B2

(12) United States Patent
Bonanno et al.

(10) Patent No.: US 9,632,789 B2
(45) Date of Patent: *Apr. 25, 2017

(54) BRANCH PREDICTION BASED ON CORRELATING EVENTS

(71) Applicant: INTERNATIONAL BUSINESS MACHINES CORPORATION, Armonk, NY (US)

(72) Inventors: James J. Bonanno, Wappingers Falls, NY (US); Richard J. Moore, Waterlooville (GB); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/553,453

(22) Filed: Nov. 25, 2014

(65) Prior Publication Data

US 2015/0363204 A1 Dec. 17, 2015

Related U.S. Application Data

(63) Continuation of application No. 14/303,758, filed on Jun. 13, 2014.

(51) Int. Cl.
*G06F 9/38* (2006.01)
*G06F 9/30* (2006.01)
*G06F 9/46* (2006.01)

(52) U.S. Cl.
CPC ........ *G06F 9/3806* (2013.01); *G06F 9/30054* (2013.01); *G06F 9/3844* (2013.01); *G06F 9/46* (2013.01)

(58) Field of Classification Search
CPC .............................. G06F 9/3806; G06F 9/3844
See application file for complete search history.

(56) References Cited

U.S. PATENT DOCUMENTS 5,909,573 A 6/1999 Sheaffer
6,779,108 B2 * 8/2004 Ju ........................... G06F 9/383
712/219

(Continued)

FOREIGN PATENT DOCUMENTS

EP 2549376 A1 1/2013

OTHER PUBLICATIONS

Marius Evers, "Improving Branch prediction by Understanding Branch Behavior," 2000, Ph. D. Dissertation, Dept. of Computer Science and Engineering, Univ. Mich. 163 pages.*

(Continued)

*Primary Examiner* — Andrew Caldwell
*Assistant Examiner* — Yuqing Xiao
(74) *Attorney, Agent, or Firm* — Margaret M. McNamara, Esq.; Blanche E. Schiller, Esq.; Heslin Rothenberg Farley & Mesiti P.C.

(57) ABSTRACT

Branch prediction using a correlating event, such as an unconditional branch that calls a routine including the branch, instead of the branch itself, to predict the behavior of the branch. The circumstances in which the branch is employed, and not the actual branch itself, is used to predict how strongly taken or not taken the branch is to behave. An anchor point associated with the branch (e.g., an address of the instruction calling a routine that includes the branch), an address of the branch, and a value that represents the number of selected branch instructions between the anchor point and the branch are used to select information to be used to predict the direction of the branch.

9 Claims, 18 Drawing Sheets

(56) References Cited

U.S. PATENT DOCUMENTS

| | | | | |
|---|---|---|---|---|
| 7,571,302 | B1* | 8/2009 | Chen | G06F 9/3838 712/217 |
| 7,644,258 | B2* | 1/2010 | Glew | G06F 9/3848 712/239 |
| 8,078,852 | B2 | 12/2011 | Al-Otoom et al. | |
| 8,694,760 | B2* | 4/2014 | Amano | G06F 9/3806 712/233 |
| 2007/0220239 | A1* | 9/2007 | Dieffenderfer | G06F 9/3848 712/240 |
| 2010/0064123 | A1* | 3/2010 | Zuraski, Jr. | G06F 9/3844 712/239 |
| 2012/0117362 | A1 | 5/2012 | Bhargava et al. | |
| 2012/0124349 | A1 | 5/2012 | Jarvis et al. | |
| 2013/0151823 | A1 | 6/2013 | Beaumont-Smith et al. | |
| 2013/0332715 | A1 | 12/2013 | Bonanno et al. | |
| 2014/0019738 | A1 | 1/2014 | Kataoka et al. | |

OTHER PUBLICATIONS

Heil et al., "Improving Branch predictors by Correlating on Data Values," Nov. 1999, Proceedings on 32nd Annual International Symposium on Microarchitecture, pp. 28-37.*

Anonymous, "Static Local, Dynamic Global, Branch Predictions," IPCOM000159324D, Oct. 2007, pp. 1-3.

Jimenez, Daniel, et al., "Dynamic Branch Prediction with Perceptrons," $7^{th}$ International Symposium on High Performance Computer Architecture, Jan. 2001, pp. 197-206.

Lipasti, Mikko, "Advanced Branch Prediction," http://ece752.ece.wisc.edu/lect09-adv-branch-prediction.pdf, Nov. 2009, pp. 1-49.

McFarling, Scott, "Comining Branch Predictors," WRL Technical Note TN-36, Jun. 1993, pp. 1-25.

Seznec, A., "A 256 Kbits L-TAGE Branch Predictor," Journal of Instruction-Level Parallelism (JILP) Special Issue: The Second Championship Branch Prediction Competition (CBP-2), vol. 9, May 2007, pp. 1-6.

Stark, Jared, et al., "Variable Length Path Branch Prediction," Proceedings of the eighth international conference on Architectural support for programming languages and operating systems, Dec. 1998, pp. 170-179.

Z/Architecture—Principles of Operation, Publication No. SA22-7832-09, 10th Edition, Sep. 2012, pp. 1-1568.

List of IBM Patents or Patent Applications Treated As Related, May 13, 2015, 2 pages.

* cited by examiner

BRANCH PREDICTION BASED ON CORRELATING EVENTS

CROSS-REFERENCE TO RELATED APPLICATIONS

This application is a continuation of co-pending U.S. patent application Ser. No. 14/303,758, filed Jun. 13, 2014, entitled "BRANCH PREDICTION BASED ON CORRELATING EVENTS," which is hereby incorporated herein by reference in its entirety.

BACKGROUND

One or more aspects relate, in general, to computer processing, and in particular to, predicting the direction of branches within instruction streams.

Computing environments often use instruction pipelining to improve instruction execution, by allowing a number of instructions to be executed in parallel. In particular, a pipeline has a plurality of processing stages and different instructions may be processing at different stages of the pipeline in parallel. With such processing, however, a conditional branch instruction may result in a pipeline stall if the processor waits until the condition that defines the direction of the branch (i.e., taken or not taken) is resolved before fetching a next instruction. Thus, a branch predictor may be used to attempt to guess whether a branch will be taken or not; i.e. the direction of the branch. This allows the processing to be speculatively executed in the direction that the code eventually proceeds when the branch direction is predicted accurately. The penalty for an incorrect prediction equals or slightly exceeds the penalty encountered for stalling at the branch until the outcome of the branch is known. However, the performance gain for correctly predicting the branch direction can be as great as a cycle count advantage that is of similar length to the pipeline stall.

Further, a branch predictor may also include branch target prediction, which attempts to guess a target of a taken branch before it is computed by decoding and executing the instruction itself.

SUMMARY

Shortcomings of the prior art are overcome and advantages are provided through the provision of a method of predicting the direction of branches. The method includes, for instance, obtaining, by a processor of a computing environment, a branch instruction for which a direction of a branch of the branch instruction is to be predicted; and predicting, by the processor, the direction of the branch, the predicting employing a correlating value to select information to be used in the predicting, the correlating value based on an occurrence of a correlating event used to obtain the branch instruction, the correlating event being an event different from the branch instruction and configured to affect a direction of a flow of code that includes the correlating event.

Computer program products and systems relating to one or more embodiments are also described and may be claimed herein. Further, services relating to one or more embodiments are also described and may be claimed herein.

Additional features and advantages are realized. Other embodiments and aspects are described in detail herein and are considered a part of the claimed invention.

BRIEF DESCRIPTION OF THE SEVERAL VIEWS OF THE DRAWINGS

One or more aspects are particularly pointed out and distinctly claimed as examples in the claims at the conclusion of the specification. The foregoing and other objects, features, and advantages are apparent from the following detailed description taken in conjunction with the accompanying drawings in which:

DETAILED DESCRIPTION

Figure 1:
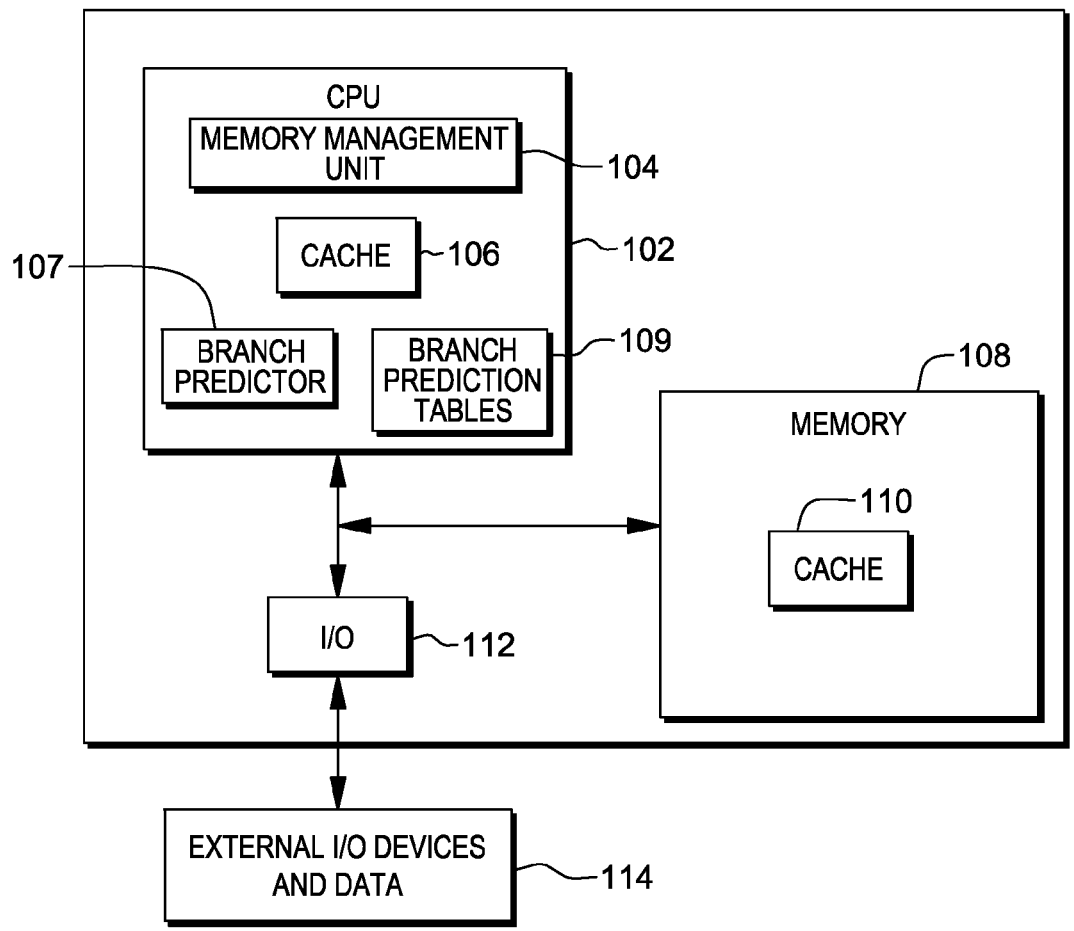
FIG. 1 depicts one example of a computing environment to incorporate and use one or more aspects of a branch prediction capability.

In accordance with one or more aspects, a branch prediction capability is provided that enhances a prediction of the direction of a branch (e.g., a conditional branch) that occurs in an instruction stream; i.e., enhances the prediction of whether the branch is taken or not taken. In one example, prediction logic is employed that uses a correlating event, such as the routine that is calling a routine that includes the branch, instead of the branch itself, to predict the behavior of the branch. That is, the logic uses the circumstances in which the branch is employed and not the actual branch itself to predict how strongly taken or not taken the branch is to behave. In one particular example, the logic uses, for instance, a correlating value (also referred to herein as an anchor point) associated with the branch (e.g. an address of the instruction calling the routine that contains the branch), an address of the branch, and a value (e.g., an ordinal value) that represents a number of selected branch instructions (e.g., the total number of branch instructions, or a subset thereof, such as taken branches, conditionally taken branches, or other selected branches) between the anchor point and the branch to predict the direction of the branch.

As one example, the correlating value, the address of the branch, and the ordinal value are combined in a selected manner (e.g., concatenated, XOR, etc.) to provide an index into a branch prediction structure, such as a pattern anchor table (PAT), in order to obtain the predicted direction. The index selects an entry in the table, and that entry includes a saturation counter that predicts the direction of the branch. Thus, the pattern anchor table has an index that is based not only on the pattern of the branch and the actual location of the branch, but also on the anchor point, which is typically an address from where the routine containing the branch is called. The anchor point is also called a pattern anchor herein.

The pattern anchor table is one structure that may be employed to predict the direction of a branch. In one embodiment, there are a plurality of branch prediction structures that may be used, including, for instance, a branch history table (BHT), one or more pattern history tables (PHTs), and one or more pattern anchor tables (PATs). Further, prediction logic is used that includes rules that define which table is to be used to obtain the prediction. The use of these tables, as well as the rules, is further described below.

Computing environments of different architectures may incorporate and use one or more aspects of the branch prediction capability provided herein. For instance, environments based on the z/Architecture, offered by International Business Machines Corporation (IBM®), and described in z/Architecture—Principles of Operation, Publication No. SA22-7932-09, 10th Edition, September 2012, which is hereby incorporated by reference herein in its entirety, may include one or more aspects, as well as computing environments of other architectures, including but not limited to, the PowerPC architecture, also referred to as Power ISA, also offered by International Business Machines Corporation.

IBM, Z/ARCHITECTURE, Z/OS, Z/VM, z/VSE, POWER, and POWERPC (referenced herein) are registered trademarks of International Business Machines Corporation, Armonk, N.Y. Other names used herein may be registered trademarks, trademarks or product names of International Business Machines Corporation or other companies.

One example of a computing environment to incorporate and use one or more aspects of the branch prediction capability is described with reference to FIG. 1. In one example, a computing environment 100 includes a processor (central processing unit—CPU) 102 that includes at least one memory management unit 104 to manage the memory and provide, for instance, address translation; one or more caches 106; a branch predictor 107 to facilitate predicting the direction of branches; and one or more branch prediction tables 109 used by the branch predictor to predict the direction of a branch (referred to herein as branch prediction). In one embodiment, the branch predictor includes the branch prediction logic, while the branch prediction tables are separate. However, in other embodiments, the branch predictor includes the branch prediction logic and the branch prediction tables.

Processor 102 is communicatively coupled to a memory portion 108 having one or more caches 110, and to an input/output (I/O) subsystem 112. I/O subsystem 112 is communicatively coupled to external I/O devices 114 that may include, for example, data input devices, sensors and/or output devices, such as displays.

Figure 2:
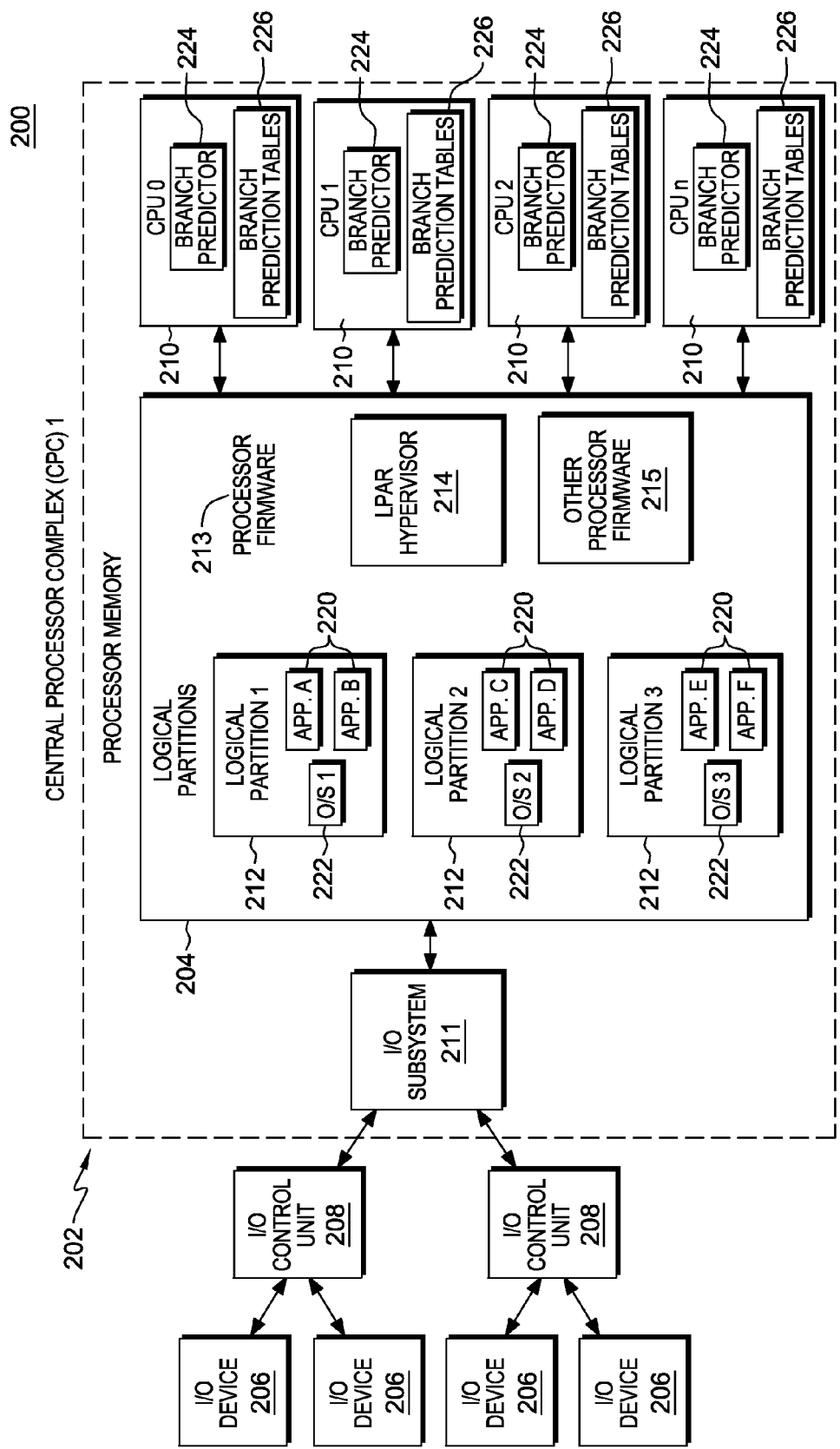
FIG. 2 depicts another example of a computing environment to incorporate and use one or more aspects of a branch prediction capability.

Another embodiment of a computing environment to incorporate and use one or more aspects of the branch prediction capability is described with reference to FIG. 2. Referring to FIG. 2, in one example, a computing environment 200 is based on the z/Architecture, offered by International Business Machines (IBM®) Corporation, Armonk, N.Y. Computing environment 200 includes, for example, a central processor complex (CPC) 202 coupled to one or more input/output (I/O) devices 206 via one or more control units 208. Central processor complex 202 includes, for instance, a processor memory 204 (a.k.a., main memory, main storage, central storage) coupled to one or more central processors (a.k.a., central processing units (CPUs)) 210, and an input/output subsystem 211, each of which is described below.

Processor memory 204 includes, for example, one or more partitions 212 (e.g., logical partitions), and processor firmware 213, which includes, for instance, a logical partition hypervisor 214 and other processor firmware 215. One example of logical partition hypervisor 214 is the Processor Resource/System Manager (PR/SM), offered by International Business Machines Corporation, Armonk, N.Y.

A logical partition functions as a separate system and has one or more applications 220, and optionally, a resident operating system 222 therein, which may differ for each logical partition. In one embodiment, the operating system is the z/OS operating system, the z/VM operating system, the z/VSE operating system, or the TPF operating system, offered by International Business Machines Corporation, Armonk, N.Y.

Logical partitions 212 are managed by logical partition hypervisor 214, which is implemented by firmware running on processors 210. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 210 are physical processor resources allocated to the logical partitions. In particular, each logical partition 212 has one or more logical processors, each of which represents all or a share of a physical processor 210 allocated to the partition. The logical processors of a particular partition 212 may be either dedicated to the partition, so that the underlying processor resource 210 is reserved for that partition; or shared with another partition, so that the underlying processor resource is potentially available to another partition.

Central processors 210 include, in one embodiment, a branch predictor 224 used along with branch prediction tables 226 to predict the direction of branches included in instruction streams. Again, the branch prediction tables may be considered a part of the branch predictor or separate therefrom.

Input/output subsystem 211 directs the flow of information between input/output devices 206 and main storage 204. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 206. In this particular example, these paths are called channel paths, since the communication adapters are channels.

Figure 3A:
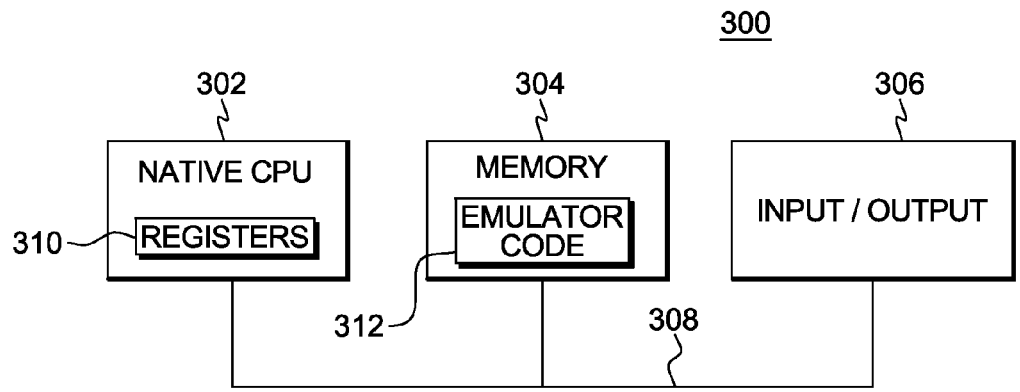
FIG. 3A depicts yet another example of a computing environment to incorporate and use one or more aspects of a branch prediction capability.

Another embodiment of a computing environment to incorporate and use one or more aspects of the branch prediction capability is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, a pSeries server or an xSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment. These registers include information that represent the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 3B:
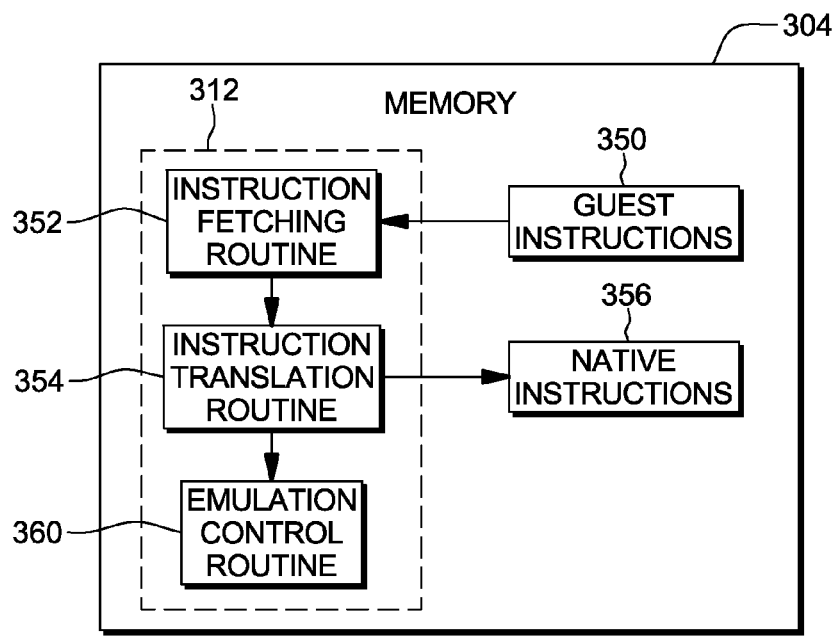
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each of the computing environments described above may include a processing system that may be included within a computer processor or otherwise distributed within a computing environment. In one example, referring to FIG. 4, a processing system 400 includes a memory 402, an instruction cache 404, an instruction fetch unit 408, and a processing pipeline 406. Instructions and data may be stored in memory 402, and instruction cache 404 may access instructions in memory 402 and store the instructions to be fetched. Memory 402 may include any type of volatile or non-volatile memory, such as cache memory. Memory 402 and instruction cache 404 may include multiple cache levels. A data cache (not depicted) may also be included in processing system 400.

Instruction fetch unit 408 includes a branch predictor 418 that includes the branch prediction logic and, in one embodiment, the branch prediction tables of one or more aspects described herein. Alternatively, branch predictor 418 may be located apart from instruction fetch unit 408, and/or the tables may be separate therefrom.

Figure 4:
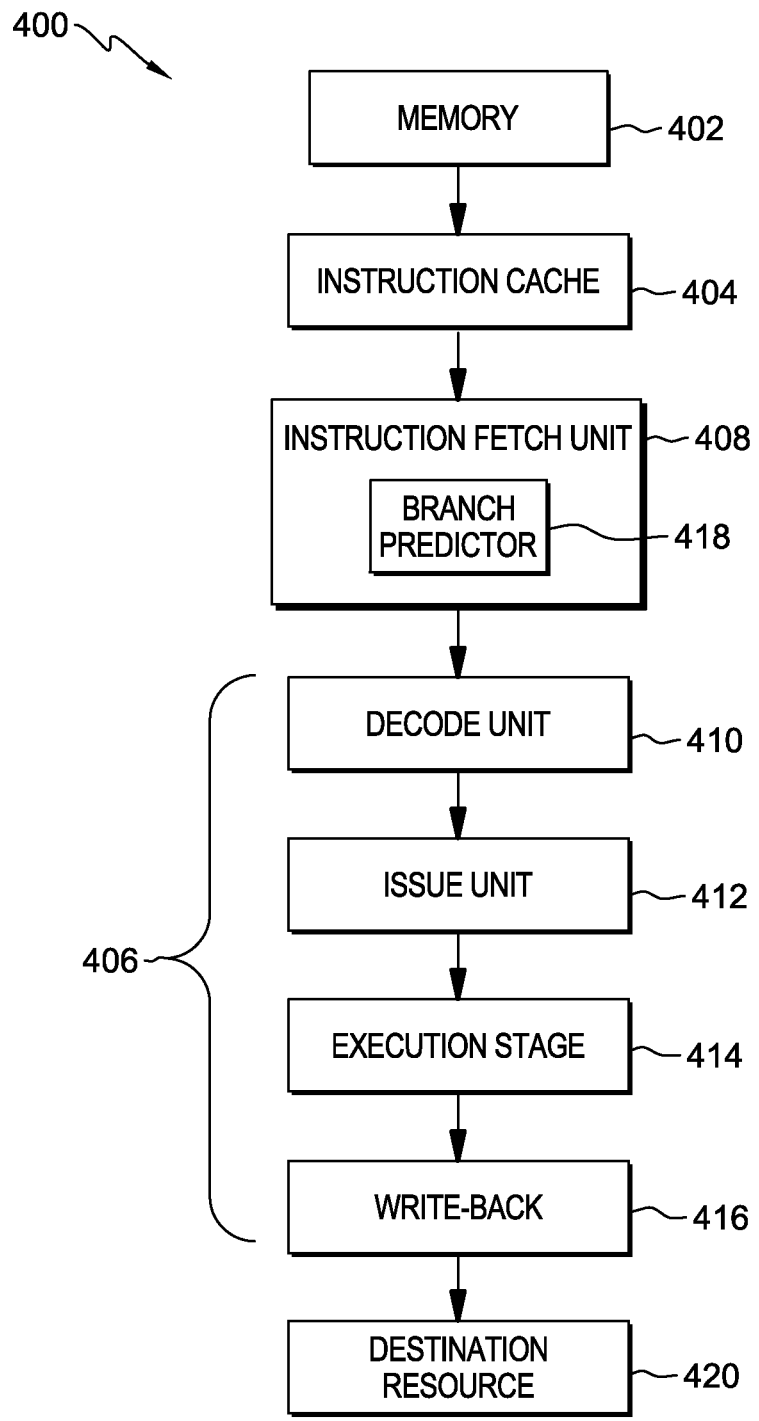
FIG. 4 depicts one example of a processing system to use branch prediction.

Processing pipeline 406 includes a decode unit 410, an issue unit 412, an execution stage 414, and write-back logic 416. The entire instruction fetch unit 408 or branch predictor 418 may also be part of processing pipeline 406. Processing pipeline 406 can include other features, such as error checking and handling logic, one or more parallel paths through processing pipeline 406, and other features known in the art. Further, processing system 400 can include multiple processing pipelines 406 and instruction fetch units 408. While a forward path through processing system 400 is depicted in FIG. 4, other feedback and signaling paths may be included between elements of processing system 400.

Decode unit 410 decodes instructions and passes the decoded instructions, portions of the instructions, or other decoded data to issue unit 412. Issue unit 412 analyzes the instructions or other data and transmits the decoded instructions, portions of the instructions, or other data to one or more execution units in execution stage 414 based on the analysis. Execution stage 414 executes the instructions, and may include a plurality of execution units, such as fixed-point execution units, floating point execution units, load/store execution units, and vector execution units, as examples. Write-back logic 416 writes results of instruction execution back to a destination resource 420. Destination resource 420 may be any type of resource, including, for instance, registers, cache memory, other memory, I/O circuitry to communicate with other devices, other processing circuits, or any other type of destination for executed instructions or data.

In accordance with one or more aspects, a branch predictor (e.g., branch predictor 107, branch predictor 224, or branch predictor 418, as examples) uses one or more branch prediction structures (e.g., tables 109, 226) to predict the direction of a branch. These structures (e.g., 109, 226), include, for instance, a branch history table (BHT), one or more pattern history tables (PHTs), and one or more pattern anchor tables (PAT), each of which is described below. Each table is implemented, in one example, as an n-way (e.g., 4-way) set associative structure used to hold a saturation counter for each branch to be predicted. A saturation counter records a 4-state value to enable branch direction to be predicted. The four states include, for instance: 0—strongly not taken; 1—weakly not taken; 2—weakly taken; and 3—strongly taken. As each branch is taken, the saturation counter is incremented; an increment to a value of, e.g., 3 saturates and remains at 3. When a branch that is encountered is not taken, the saturation counter is decremented; a decrement to a value of, e.g., 0 saturates and remains at 0.

The branch history table holds branch history information and employs that information to predict whether a branch is to be taken or not taken. It is indexed using the address of the branch whose direction is to be predicted. In one implementation, the branch history table includes two tables, the branch history table and a branch target buffer (BTB) used to predict the target of a predicted taken branch based on the address of the branch instruction.

A pattern history table holds branch pattern history information and employs that information to predict whether a branch is to be taken or not taken. It is indexed using a function of the address of the branch to be predicted and the branch history (i.e., the outcome of the immediately preceding branches). The branch history is represented by a binary number of a fixed number of digits, where a binary digit 1 signifies a branch taken and a binary digit 0 signifies a branch not taken. The index may be formed using, for instance, an XOR of the address of the branch and the branch history (e.g., using GSHARE) or a concatenation (e.g., using GSELECT) of the address of the branch and the branch history (i.e., outcome).

A pattern anchor table holds correlation information and employs that information to predict whether a branch is to be taken or not taken. For instance, it has been determined, in accordance with one or more aspects, that branch direction may correlate to a single variable whose value (a correlating value) is known at the time a prediction is being made. For example, the direction may correlate to the address of the instruction that calls a subroutine that includes a branch (referred to herein as the address of the caller of the branch; although, in this example, the caller calls a subroutine that includes the branch, in other examples, the caller may call the branch directly or other constructs that include the branch; all of which are referred to as the address of the caller of the branch). Other correlators are also possible, including but not limited to, values of parameters passed to subroutines, such as length values or other values.

The correlating value may be determined from any predetermined events (i.e., correlating events) that are deemed useful for the purpose of branch prediction. For example, the occurrence of an unconditional branch may be the correlating event and an address of that branch may be the correlating value. There are, however, other predetermined events, such as a specific sequence of instructions, a particular value associated with an outcome or input to a sequence of instructions, or some other marker that is recognized by the processor. In one example, if the correlating event or anchor is associated with an instruction or a particular sequence of instructions, and more specifically, an unconditional branch, the processor is to tag those instructions in its pipeline as signaling a correlation event. Where a single branch is used as the correlation event, a 1-bit tag may be placed in the branch history table to indicate a branch whose address acts as an anchor.

The pattern anchor table is indexed by an index formed from a plurality of components, including, for instance, a function of the correlating value (e.g., the address of the caller of the branch), the address of the branch for which the direction is being predicted, and an ordinal number relating to the number of branches between the correlating value or anchor and the branch for which prediction is being performed. The index may be formed by combining the components, either by, for instance, XOR (using, e.g., GSHARE) or concatenation (using, e.g., GSELECT). Other combining functions are also possible.

Figure 5:
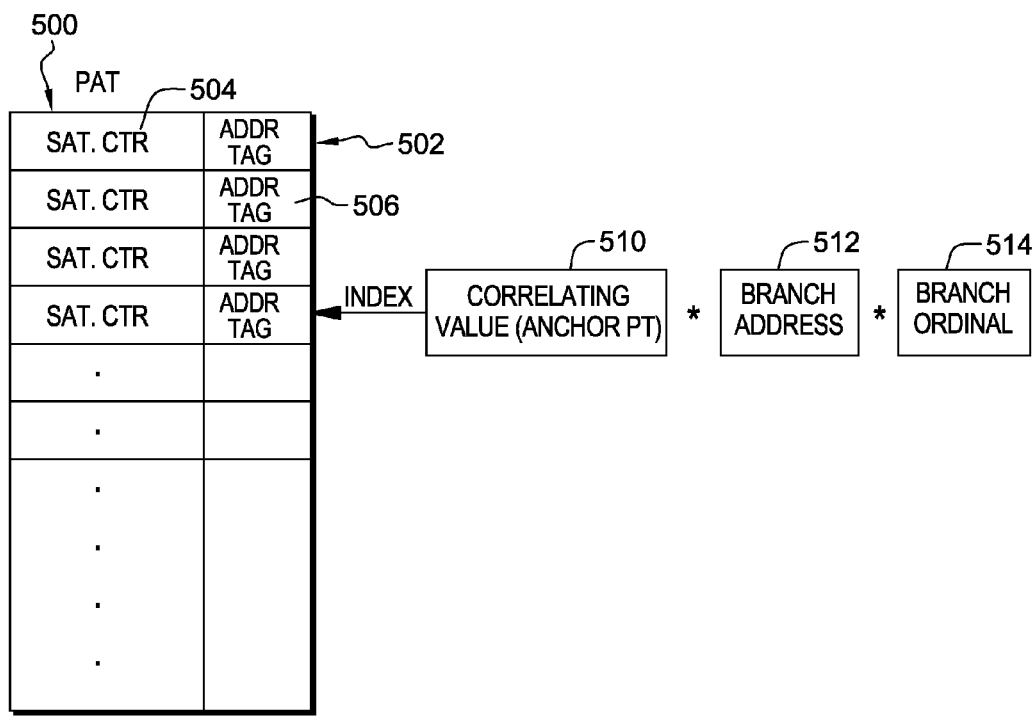
FIG. 5 depicts one example of a pattern anchor table (PAT) used in branch prediction.

One example of a pattern anchor table is depicted in FIG. 5. As shown, a pattern anchor table 500 includes one or more entries 502, and each entry includes a saturation counter 504 indicating predicted branch direction. As described above, each saturation counter 504 records a 4-state value to enable branch direction to be predicted. The four states include, for instance: 0—strongly not taken; 1—weakly not taken; 2—weakly taken; and 3—strongly taken. When the branch associated with the saturation counter is taken, the saturation counter is incremented by one to a maximum of 3, and when the branch is not taken, the saturation counter is decremented by one to a minimum of 0. To locate an entry that includes the saturation counter associated with a particular branch, an index is formed using an anchor point 510 (e.g., an address of the caller of the branch; also referred to as a correlating value), an address of the branch to be predicted 512, and a branch ordinal 514 representing the number of branches between the anchor point and the branch for which the direction is being predicted.

Further, in one embodiment, each entry 502 includes an address tag (ADDR TAG) 506. Address tag 506 is, for instance, a subset of bits that define the address of the branch to be predicted. Upon indexing into the table, the tag address is to match the appropriate bits of the branch address of the branch that is to be predicted.

Figure 6A:
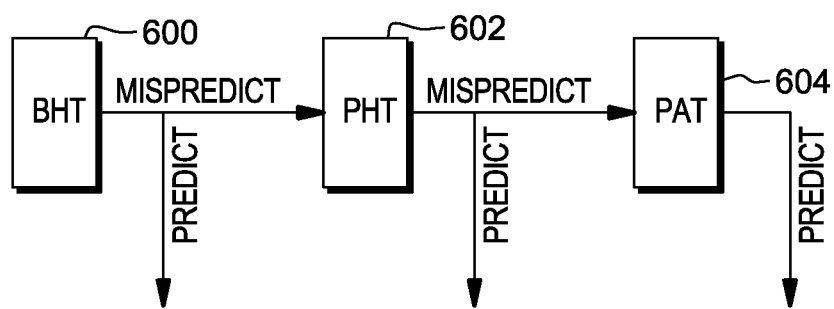
FIG. 6A depicts one embodiment of using a plurality of branch prediction tables to predict the direction of a branch.

In accordance with one or more aspects, the prediction logic employs one or more of the tables to predict the direction of any particular branch. For instance, referring to FIG. 6A, initially, a branch history table (BHT) 600 is accessed that includes entries for branches that are to be predicted. If an indicator, referred to as a branch history table override, located in the entry corresponding to the branch to be predicted is set (e.g., =1) indicating that the branch history table is to be overridden (e.g., due to a previous misprediction for this branch), then a pattern history table (PHT) 602 is accessed.

The pattern history table includes entries, for instance, for those branches for which the branch history override indicator is set in the branch history table. Assuming another indicator, referred to as a pattern history table override, is not set (e.g., in the branch history table) for the branch to be predicted, the entry in the pattern history table corresponding to the branch to be predicted is referenced to obtain the saturation counter. For instance, based on referencing the PHT, an address tag stored within the given entry is compared to the address of the branch to be predicted. Based on a tag match, the PHT is deemed to have a prediction for the branch of interest. Given a tag match, if the saturation counter has a strong prediction, either taken or not taken, then that prediction is used; otherwise, another prediction table, such as the branch history table, is used to make the prediction. If there is not a tag match, another prediction table, such as the branch history table, is used to make the prediction.

If, however, the pattern history table override indicator is set indicating that the pattern history table may have previously mispredicted for this branch, or for some other reason, a table other than the pattern history table is to be used for prediction, a pattern anchor table (PAT) 604 is accessed. The pattern anchor table includes entries, for instance, for those branches for which the pattern history table override indicator is set in the branch history table. The entry corresponding to the branch to be predicted is accessed to obtain the saturation counter. For instance, based on referencing the PAT, an address tag stored within the given entry is compared to the address of the branch to be predicted. Based on a tag match, the PAT is deemed to have a prediction for the branch of interest. Given a tag match, if the saturation counter has a strong prediction, either taken or not taken, then that prediction is used; otherwise, another prediction table, such as the pattern history table or the branch history table, is used to make the prediction. If there is not a tag match, another prediction table, such as the pattern history table or the branch history table, is used to make the prediction.

Figure 6B:
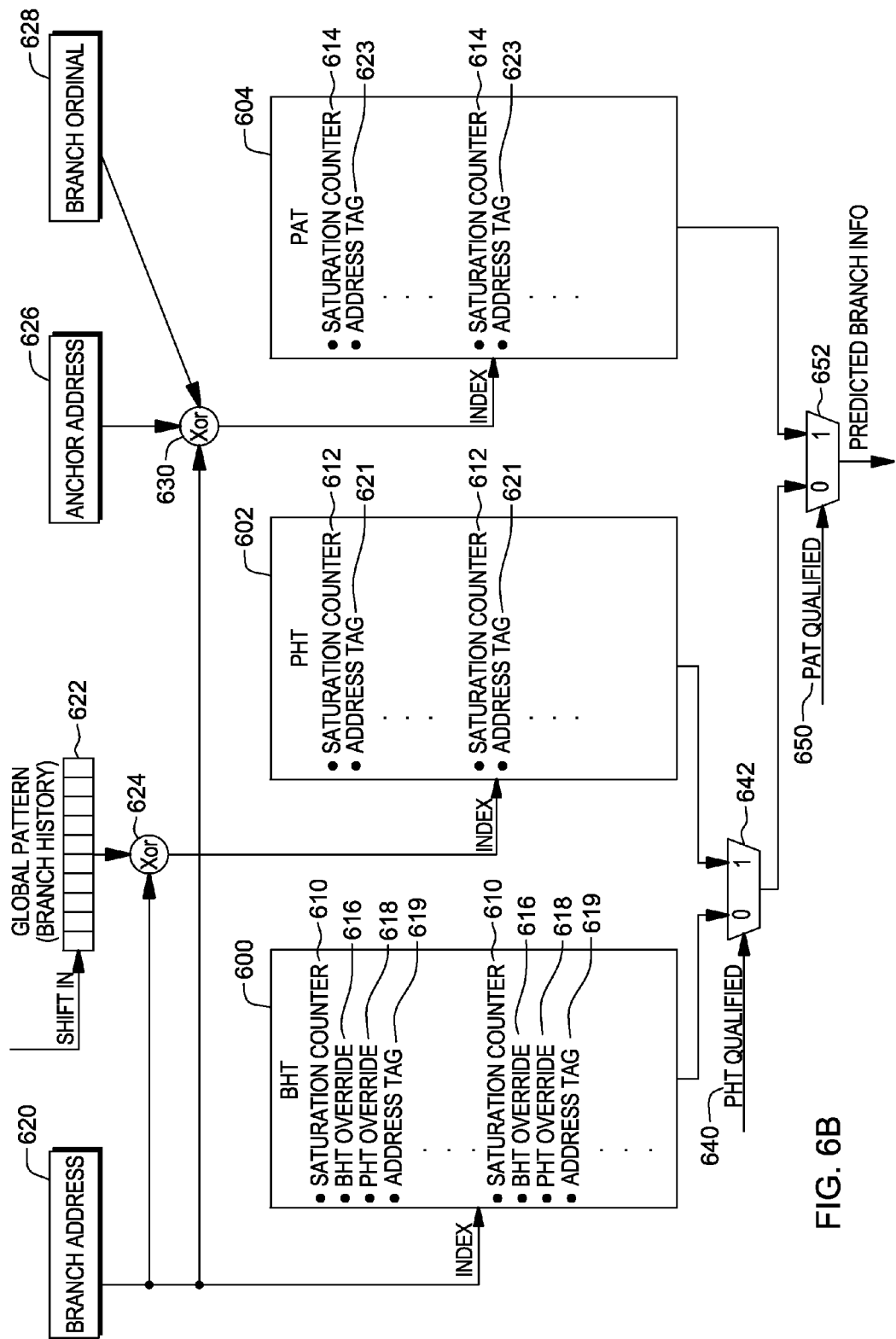
FIG. 6B depicts further details regarding the use of a plurality of branch prediction tables to predict the direction of a branch.

Further details regarding the use of various prediction tables are described with reference to FIG. 6B. As depicted, the prediction tables include branch history table (BHT) 600, pattern history table (PHT) 602, and pattern anchor table (PAT) 604. Each table includes one or more entries, and each entry includes a saturation counter 610, 612, 614, respectively, for each branch to be predicted using the respective table. Each entry also includes an address tag field 619, 621, 623. The address tag field of the given entry is used to compare against the address of the branch which is being predicted. Based on a tag match, the table is deemed to have an entry for the branch that is to be predicted. Further, branch history table 600 includes, for instance, a branch history table override indicator 616 and a pattern history table override indicator 618 for each entry in its table.

Although in the examples herein the override indicators are included in the BHT table, in other embodiments, one or more of the indicators may be in other tables. For instance, the PHT indicator may be in the PHT table. Further, if there are other override indicators, such as a PAT indicator, that may be in the BHT, the PHT or the PAT table, as examples. Many possibilities exist, including maintaining the override indicators in locations other than the tables.

A branch address 620 is used to index into branch history table 600; branch address 620 and a global history pattern 622 are combined (e.g., XOR 624) to form an index into pattern history table 602; and branch address 620, an anchor address 626, and a branch ordinal 628 are combined (e.g., XOR 630) to form an index into pattern anchor table 604. Table selection logic, described below, is used to provide a signal, referred to as a PHT qualified signal 640, which is input to a multiplexor 642, to select either the output from the BHT or the PHT; and another signal, referred to as a PAT qualified signal 650, is provided by other table selection logic and input to a multiplexor 652 to select either the output of multiplexor 642 or the output of the PAT to obtain the predicted direction of the branch. Each qualified signal is a function of, e.g., the override bits, the tag match and the value of the saturation counter. For instance, the PHT is qualified if the BHT override is 1, there is a tag match in the PHT, and the PHT saturation counter is in a strong state.

In one embodiment, the table selection logic includes the following, which is described in further detail below: New branches have entries installed in the branch history table. On a subsequent encounter of a branch, a prediction of the direction of the branch is made according to the saturation counter of that branch; if the branch history table mispredicts, then the pattern history table is marked for selection using e.g., a branch history table override indicator in the branch history table or, in another example, a saturation counter table selector; and an initial pattern history table saturation counter entry is installed along with the associated address tag of the branch of interest. If the pattern history table is already selected, then the prediction is made from the pattern history table. If the pattern history table mispredicts and an anchor point exists, then the pattern anchor table is marked for selection for this branch using a pattern history table override indicator in the branch history table or a saturation counter table selector.

In one embodiment, a PAT anchor is set on detection of an anchor point, e.g., an entry to a subroutine indicated by the detection of a call instruction in the instruction stream or an unconditional branch, as examples.

The PAT anchor is set to zero when the prediction correlator no longer applies, for example, on detection of a subroutine (or anchor) termination condition. Zero serves to indicate that no PAT anchor is currently set; alternative indicators may be employed as desired.

The subroutine termination condition may be detected by various means depending on machine architecture to which this technique is applied. Practical examples of subroutine or anchor termination criteria are:
1. When an identifiable return instruction is defined;
2. When a return is estimated by a branch to a location within the neighborhood of the calling instruction;
3. When the number of instructions executed since the establishment of the current PAT anchor reaches a defined threshold;
4. Where the number of branch instructions executed since the establishment of the current PAT anchor reaches a defined threshold;
5. Where the number of branch locations executed since the establishment of the current PAT anchor reaches a defined threshold;
6. Any other technique that involves counting numbers of instructions of particular types and the use of thresholds against those counters.

In the counting techniques (3-6) above, the threshold may be fixed as part of the processor design, parameterized through processor configuration or dynamically set by performance monitoring hardware or software employing specialized instructions to set the thresholds.

Figure 7:
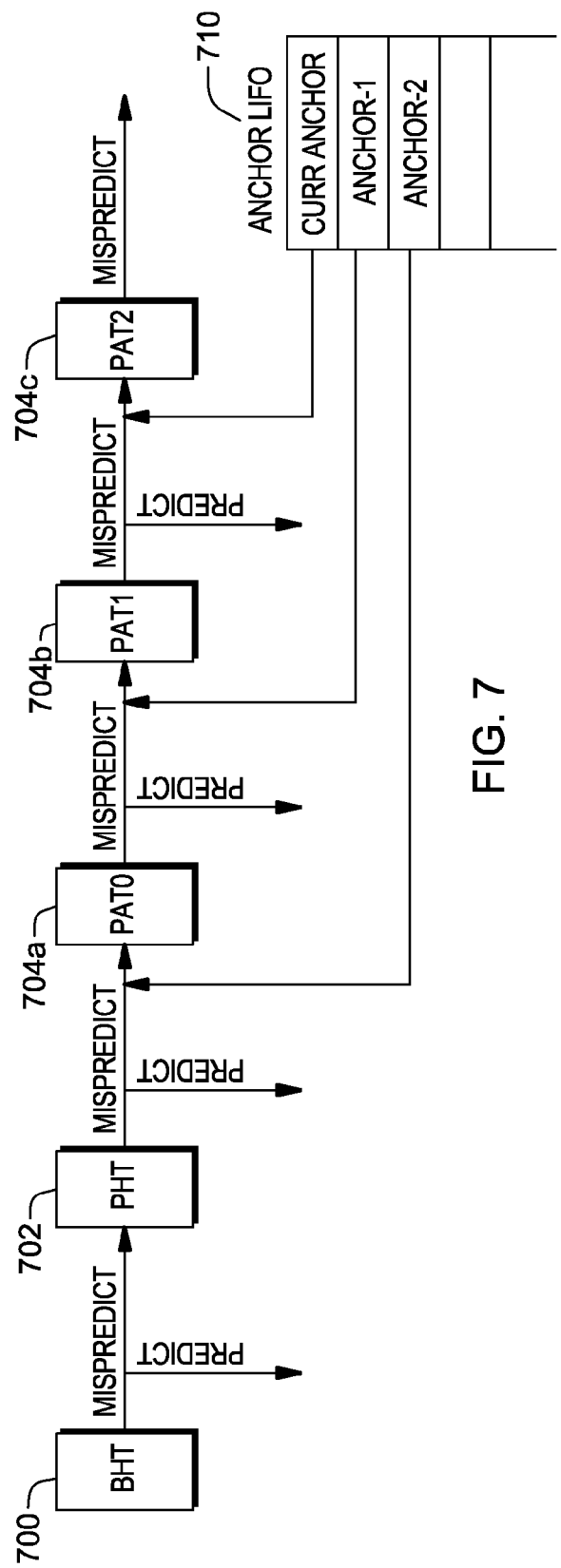
FIG. 7 depicts another embodiment of using a plurality of branch prediction tables to predict the direction of a branch.

As depicted in FIG. 7, the pattern anchor table scheme can be recursively extended by using additional tables to handle mispredictions made by prior pattern anchor tables. For instance, in one embodiment, there is a branch history table 700, a pattern history table 702, and a plurality of pattern anchor tables (PAT0) 704a,(PAT1) 704b,(PAT2) 704c. The plurality of anchor tables is implemented by maintaining, for instance, an anchor last in first out (LIFO) stack 710. As new anchor points (a.k.a., correlating values) become current, existing anchors are pushed down until they drop out of the bottom of the stack. When an anchor end condition is detected, then the current entry is discarded and all other entries move up. In one or more embodiments, the plurality of pattern anchor tables may be combined into one table with multiple indices or they may be separate tables. Further, in other embodiments, there may be more than one branch history table and/or more than one pattern history table.

As described herein, the particular branch prediction table used to obtain a prediction of the direction of a branch is determined using prediction logic, which includes table selection logic. Examples of prediction logic are described with reference to FIGS. 8-16. Initially, prediction logic relating to the branch history table and the pattern history table is described with reference to FIGS. 8-10; then, prediction logic relating to the branch history table, pattern history table, and the pattern anchor table is described with reference to FIGS. 11-13. Further, prediction logic with reference to n-level pattern anchor tables is described with reference to FIGS. 14-16. The prediction logic is included in, for instance, a branch predictor within a processor. In other embodiments, the logic is included in other components.

Figure 8:
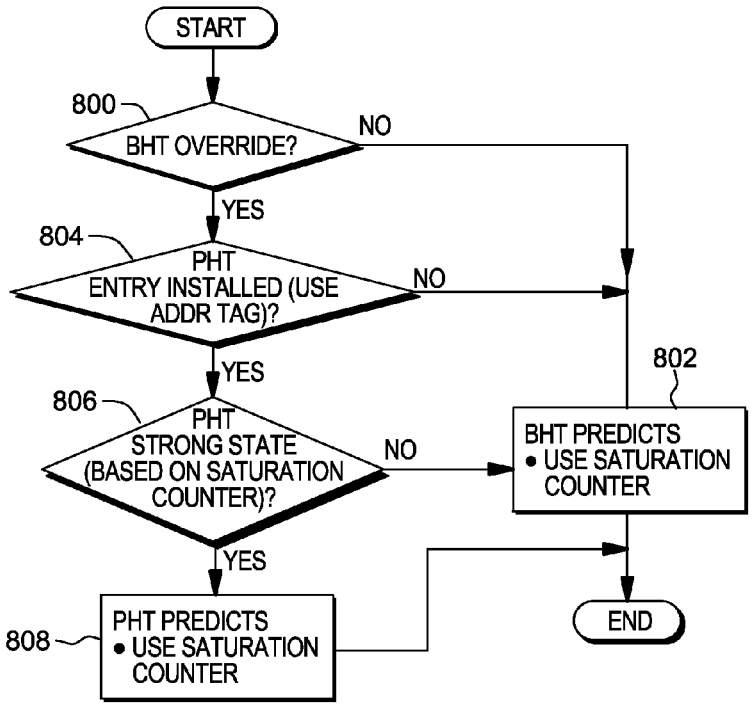
FIG. 8 depicts one example of prediction logic using one or more of a branch history table and a pattern history table.

Referring initially to FIG. 8, one embodiment of prediction logic for using a branch history table and a pattern history table for predicting the direction of a particular branch is described. In this example, the PHT override is equal to zero; i.e., a pattern anchor table is not being used.

Referring to FIG. 8, initially, the branch predictor determines whether the branch history table override indicator in the branch history table for the particular branch for which the direction is being predicted is set, INQUIRY 800. If the BHT override indicator is not set, then the branch history table is used to make the branch prediction, STEP 802. In one example, the branch history table is indexed by the branch address to locate the appropriate saturation counter. Then, the value of the saturation counter is used to predict the direction of the branch. For instance, if the value is 2 or 3, then the prediction is to take the branch; otherwise, in one embodiment, the prediction is not to take the branch. Other possibilities exist.

Returning to INQUIRY 800, if the branch history table override indicator is set, then the branch predictor determines whether a pattern history table entry is installed for this branch, INQUIRY 804. In one example, an entry for the branch is deemed installed if the particular entry into the PHT has an address tag that matches the address of the branch for which the direction is being predicted. The address tag may be the full branch address or a subset of the address bits (e.g., 4-12 bits). If the entry is not installed, then the branch history table is once again used for the prediction, STEP 802.

Returning to INQUIRY 804, if the PHT entry is installed, then a determination is made as to whether the pattern history table entry is in a strong state, INQUIRY 806. For instance, the branch predictor indexes into the pattern history table (using a combination of the branch address and the branch history) to check the saturation counter for the branch to be predicted and determines whether the saturation counter is either a value of 0 for strongly not taken or a value of 3 for strongly taken. If the saturation counter indicates a strong state, then the saturation counter in the pattern history table is used to predict the direction of the branch, STEP 808. Otherwise, if the saturation counter does not indicate a strong state (e.g., it is a value of 1 or 2), INQUIRY 806, then the branch history table is used for prediction, STEP 802.

One embodiment of updating one or more saturation counters, when the branch history table or pattern history table is used and the BHT override indicator is set, is described with reference to FIG. 9. In this example, a pattern anchor table is not being used (e.g., PHT=0).

Figure 9:
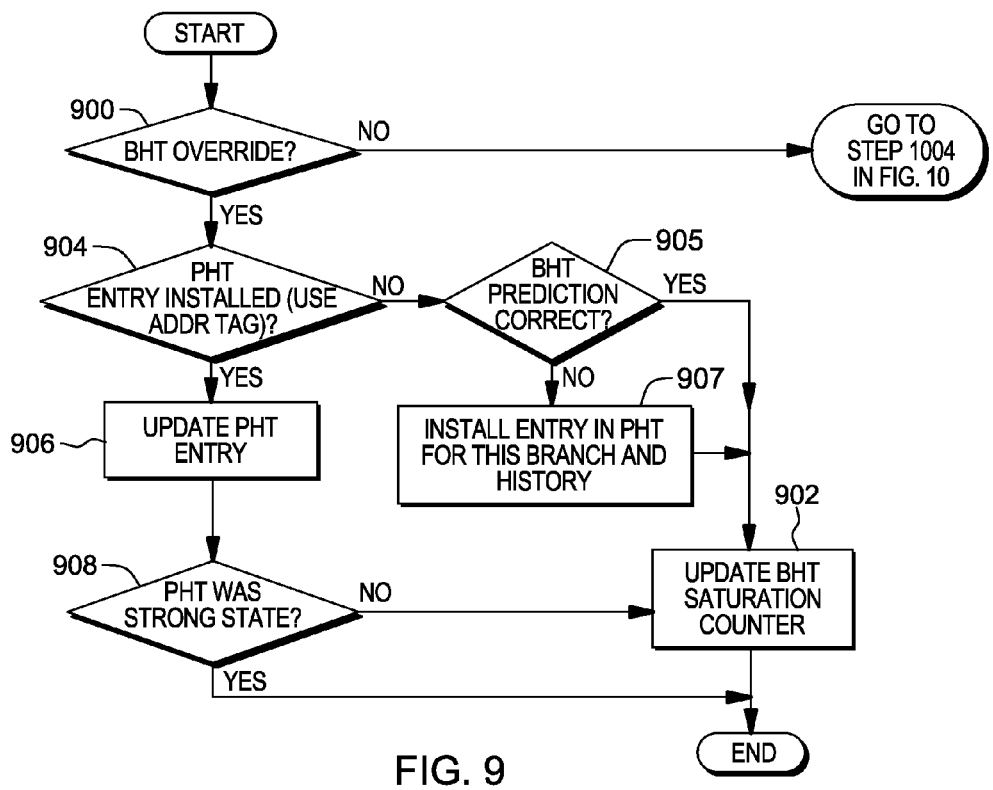
FIG. 9 depicts one example of update logic based on a branch history table override indicator being set.

Referring to FIG. 9, initially, based on executing a branch instruction, the branch predictor determines whether the branch history table override indicator for this branch is set, INQUIRY 900. If not, then processing continues at STEP 1004 in FIG. 10, which is described below. However, if the branch history table override indicator is set, INQUIRY 900, then the branch predictor determines whether a pattern history table entry for the branch is installed, INQUIRY 904, as per a tag address match described herein.

If the PHT entry is not installed, then a determination is made was to whether the BHT prediction was correct, INQUIRY 905. If it was correct, then the branch history saturation counter is updated, STEP 902. For instance, it is incremented by one to a maximum of a value of 3, if the branch is taken; or it is decremented by one to a minimum of a value of 0, if the branch is not taken. However, if the BHT prediction was not correct, INQUIRY 905, then an entry is installed in the PHT for this branch and history, STEP 907. Then, processing continues with STEP 902.

Returning to INQUIRY 904, if the pattern history table entry is installed, then the pattern history table entry including the saturation counter is updated, as described above with reference to the BHT saturation counter, STEP 906.

Further, the branch predictor determines whether the pattern history table entry was in a strong state prior to being updated, INQUIRY 908. If so, processing is complete. Otherwise, the branch history table saturation counter for the branch is also updated, STEP 902.

One embodiment of the update logic when the BHT override indicator is not set is described with reference to FIG. 10. In this example, a pattern anchor table is not used (e.g., PHT=0).

Figure 10:
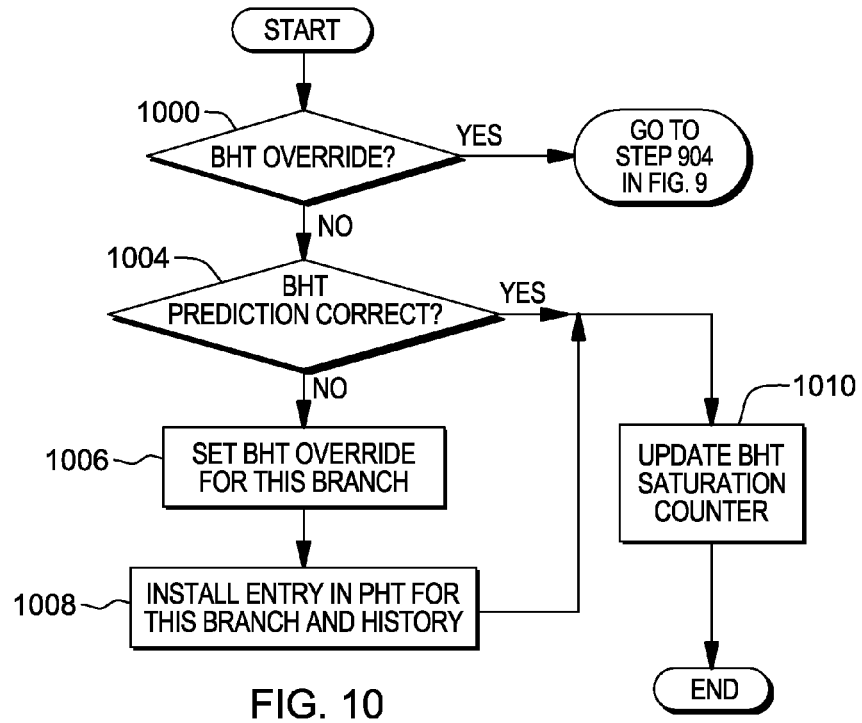
FIG. 10 depicts one example of update logic based on a branch history table override indicator not being set.

Referring to FIG. 10, initially, the branch predictor determines whether the branch history table override indicator in the branch history table for the branch just executed is set, INQUIRY 1000. If it is set, then processing continues with STEP 904 in FIG. 9. However, if the branch history table override indicator is not set, INQUIRY 1000, then the branch predictor further determines whether the branch history table prediction was correct, INQUIRY 1004. If it was correct, then the BHT saturation counter is updated, as described herein, STEP 1010. However, if the BHT prediction was incorrect, INQUIRY 1004, then the branch history table override indicator in the branch history table for this branch is set (e.g., set to 1), STEP 1006, and an entry is installed in the pattern history table for this branch (which is indexed by a combination of the branch address and the branch history), STEP 1008. In one example, the saturation counter in the PHT entry is set to weakly not taken. Further, the BHT saturation counter is updated, STEP 1010.

Figure 11:
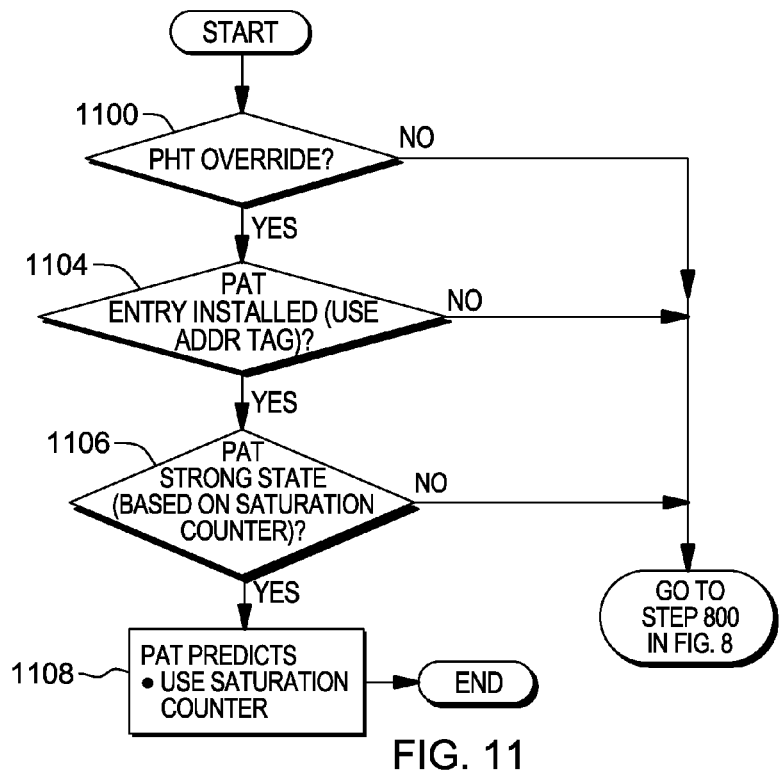
FIG. 11 depicts one example of prediction logic using one or more of a branch history table, a pattern history table and a pattern anchor table.
Figure 12:
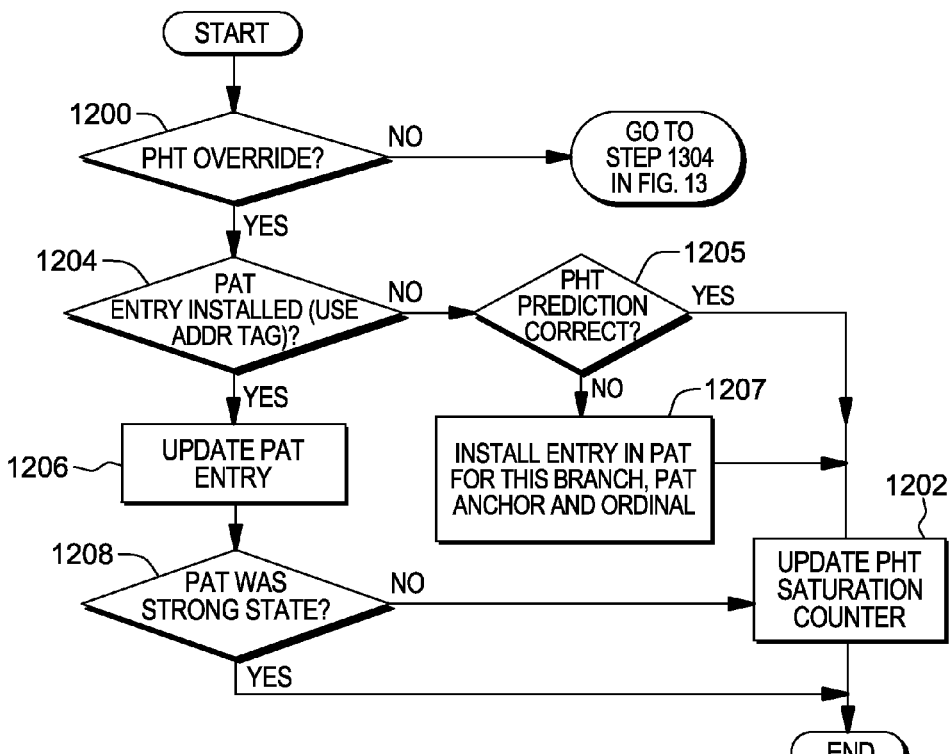
FIG. 12 depicts one example of update logic based on a pattern history table override indicator being set.
Figure 13:
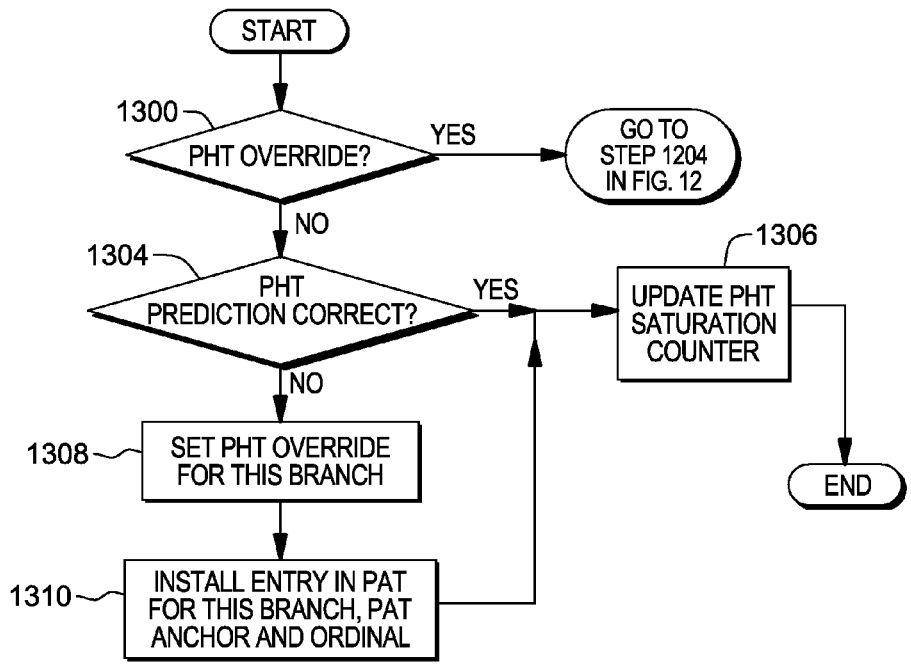
FIG. 13 depicts one example of update logic based on a pattern history table override indicator not being set.

Referring now to FIGS. 11-13, embodiments of the logic associated with using the branch history table, the pattern history table and a single pattern anchor table are described.

Referring initially to FIG. 11, one embodiment of prediction logic for using a branch history table, a pattern history table and a pattern anchor table is described. Initially, the branch predictor determines whether the pattern history table override indicator in the branch history table corresponding to the branch to be predicted is set, INQUIRY 1100. If it is not set, then processing continues with STEP 800 in FIG. 8, as described above.

Returning to INQUIRY 1100, if the pattern history table override indicator is set, then the branch predictor determines whether a pattern anchor table entry is installed for this branch, INQUIRY 1104. In one example, an entry for the branch is deemed installed if the particular entry into the PAT has an address tag that matches the address of the branch. The address tag may be the full branch address or a subset of the address bits (e.g., 4-12 bits). If the pattern anchor table entry is not installed, then processing continues with STEP 800 in FIG. 8.

Returning to INQUIRY 1104, if a pattern anchor table entry is installed for the branch to be predicted, a determination is made as to whether the pattern anchor table entry is in a strong state, INQUIRY 1106. For instance, the branch predictor indexes into the pattern anchor table (using a combination of the branch anchor, the branch address and the branch ordinal) to check the saturation counter for the branch to be predicted and determines whether the saturation counter is either a value of 0 for strongly not taken or a value of 3 for strongly taken. If the saturation counter indicates a strong state, then the saturation counter in the pattern anchor table is used to predict the direction of the branch, STEP 1108. Otherwise, if the saturation counter does not indicate a strong state (e.g., it is a value of 1 or 2), then processing continues with STEP 800 in FIG. 8.

In a further embodiment, the branch predictor determines whether there is an active anchor point prior to determining whether the PHT override indicator is set. If there is an active anchor point, then the test is made as to whether the PHT override indicator is set. Otherwise, processing continues with STEP 800 in FIG. 8.

One embodiment of updating one or more saturation counters for a branch instance which has a PHT entry, when the branch history table, pattern history table or pattern anchor table is used and the PHT override is set, is described with reference to FIG. 12. Initially, based on executing a branch instruction, the branch predictor determines whether the pattern history table override indicator is set, INQUIRY 1200. If not, then processing continues at STEP 1304 in FIG. 13. However, if the pattern history table override indicator is set, INQUIRY 1200, then the branch predictor determines whether a pattern anchor table entry for the branch is installed, INQUIRY 1204, as per a tag address match described herein.

If the PAT entry is not installed, then a determination is made as to whether the PHT prediction was correct, INQUIRY 1205. If it was correct, then the pattern history table saturation counter is updated, STEP 1202. However, if the PHT prediction was not correct, INQUIRY 1205, then an entry is installed in the PAT for this branch, PAT anchor and ordinal, STEP 1207. Then, processing continues with STEP 1202.

Returning to INQUIRY 1204, if the pattern anchor table entry is installed, then the pattern anchor table entry including the saturation counter is updated, as described above with reference to the BHT saturation counter, STEP 1206.

Further, the branch predictor determines whether the pattern anchor table entry was in a strong state prior to being updated, INQUIRY 1208. If so, processing is complete. Otherwise, the pattern history table saturation counter for this branch is also updated, STEP 1202.

One embodiment of the update logic when the PHT override indicator is not set is described with reference to FIG. 13. Initially, the branch predictor determines whether the pattern history table override indicator in the branch history table for the branch just executed is set, INQUIRY 1300. If so, then processing continues at STEP 1204 in FIG. 12, as described above. However, if the pattern history table override indicator is not set, then the branch predictor further determines whether the prediction provided by the pattern history table was correct, INQUIRY 1304. If it was correct, then the PHT saturation counter is updated, STEP 1306. For instance, if the branch was resolved taken, the saturation counter is incremented. If the branch was resolved not taken, the saturation counter is decremented, as described herein.

Returning to INQUIRY 1304, if the PHT prediction was incorrect, then the pattern history table override indicator in the branch history table for this branch is set (e.g., set to 1), STEP 1308, and an entry is installed in the pattern anchor table for this branch (which is indexed by a combination of the branch anchor, the branch address and the branch ordinal), STEP 1310. In one example, the saturation counter in the PAT entry is set to weakly not taken. Further, processing continues with STEP 1306 in which the PHT saturation counter is updated.

Figure 14:
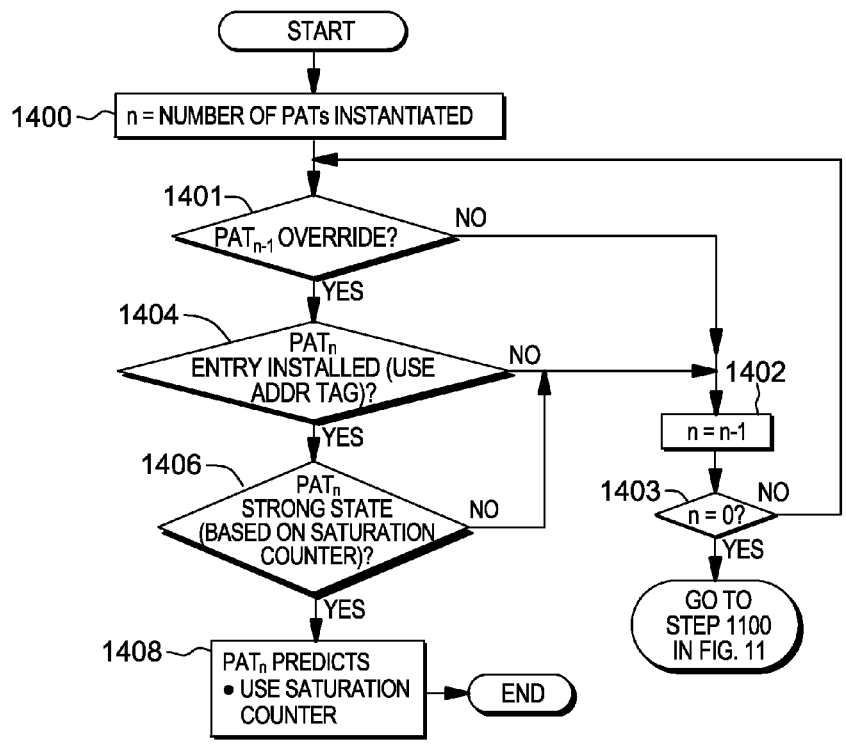
FIG. 14 depicts one embodiment of n-level pattern anchor table prediction logic.
Figure 15:
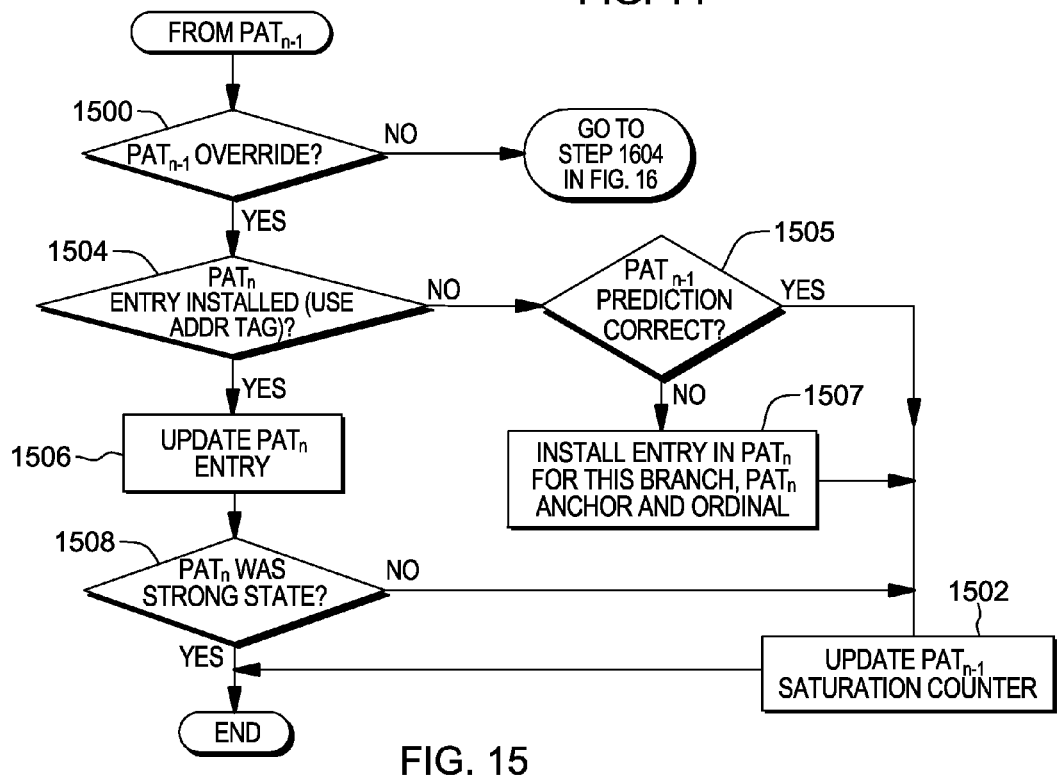
FIG. 15 depicts one embodiment of update logic based on a pattern anchor table$_{n-1}$ override indicator being set.
Figure 16:
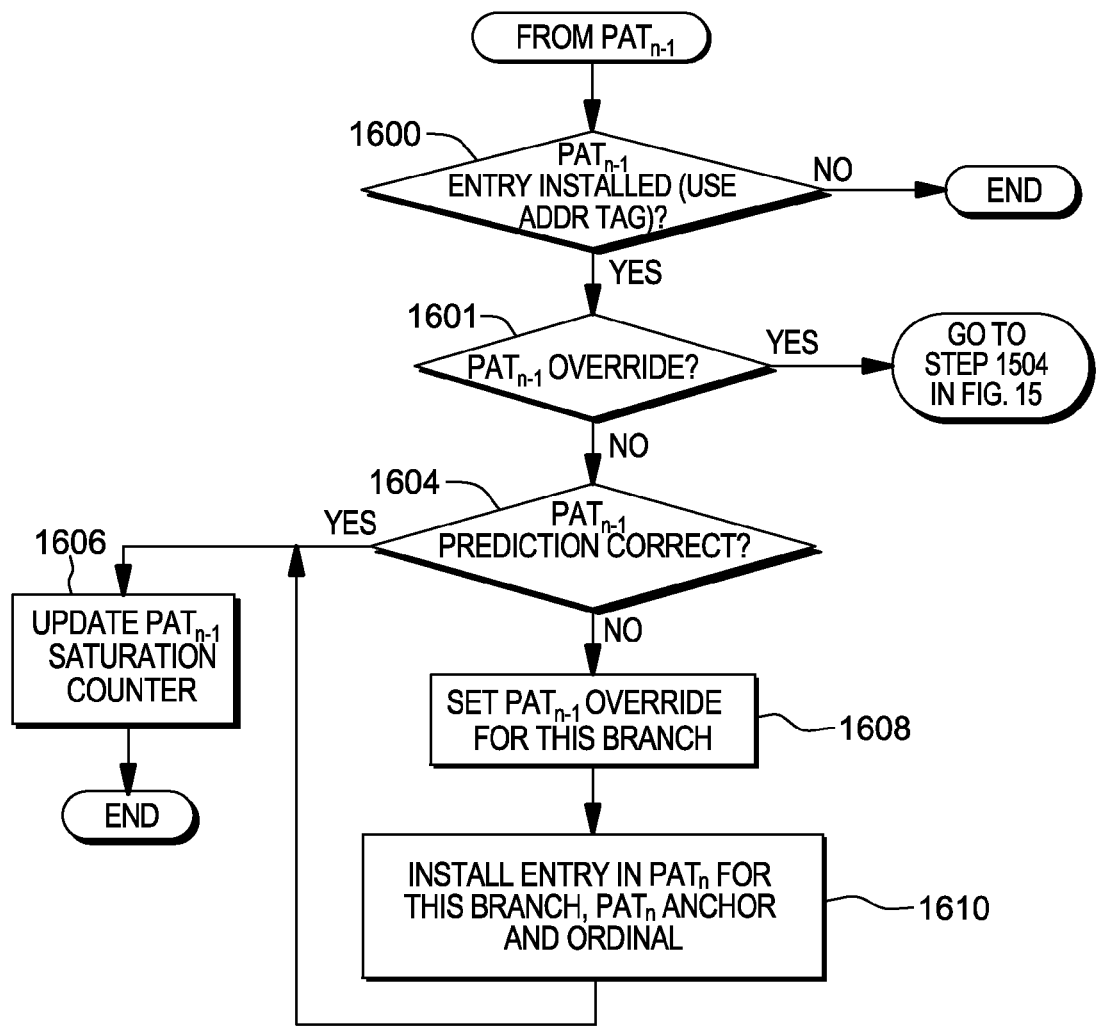
FIG. 16 depicts one embodiment of update logic based on a pattern anchor table$_{n-1}$ override indicator not being set.

Referring now to FIGS. 14-16, embodiments of the logic associated with using n-level pattern anchor table prediction logic are described. With this logic, there are additional override indicators stored in the branch history table (or elsewhere) to indicate whether a particular pattern anchor table is to be overridden.

Referring initially to FIG. 14, one embodiment of prediction logic for using n-level pattern anchor table prediction logic is described. Initially, n is set equal to a number of PATs instantiated, STEP 1400. Further, the branch predictor determines whether the pattern anchor table override indicator for $PAT_{n-1}$ in the branch history table corresponding to the branch to be predicted is set, INQUIRY 1401. If it is not set, then n is decremented (e.g., n=n−1), STEP 1402, and a determination is made as to whether n=0, INQUIRY 1403. If n is not equal to zero, then processing continues at INQUIRY 1401; otherwise, processing continues at STEP 1100 in FIG. 11.

Returning to INQUIRY 1401, if the pattern anchor table override indicator is set, then the branch predictor determines whether a pattern anchor table ($PAT_n$) entry is installed for this branch, INQUIRY 1404. In one example, an entry for the branch is deemed installed if the particular entry into the $PAT_n$ has an address tag that matches the address of the branch. The address tag may be the full branch address or a subset of the address bits (e.g., 4-12 bits). If the entry is not installed, then processing continues to STEP 1402. Otherwise, a determination is made as to whether the pattern anchor table entry ($PAT_n$) is in a strong state, INQUIRY 1406. For instance, the branch predictor indexes into the pattern anchor table (using a combination of the branch anchor, the branch address and the branch ordinal) to check the saturation counter for the branch to be predicted and determines whether the saturation counter is either a value of 0 for strongly not taken or a value of 3 for strongly taken. If the saturation counter indicates a strong state, then the saturation counter in pattern anchor table$_n$ is used to predict the direction of the branch, STEP 1408. Otherwise, if the saturation counter does not indicate a strong state (e.g., it is a value of 1 or 2), then processing continues with STEP 1402.

One embodiment of updating one or more saturation counters for a branch instance which has a PAT$_{n-1}$ entry, when using an n-level pattern anchor table and the PAT$_{n-1}$ override indicator is set, is described with reference to FIG. 15. Initially, based on executing a branch instruction, the branch predictor determines whether the pattern anchor table override indicator for PAT$_{n-1}$ is set, INQUIRY 1500. If not, then processing continues to STEP 1604 in FIG. 16, which is described below. However, if the pattern anchor table override indicator for PAT$_{n-1}$ is set, INQUIRY 1500, then the branch predictor determines whether a pattern anchor table (PAT$_n$) entry for the branch is installed, INQUIRY 1504, as per an address tag match described herein. If the entry is not installed, then a determination is made as to whether the PAT$_{n-1}$ prediction was correct, INQUIRY 1505. If it was correct, then the PAT$_{n-1}$ saturation counter is updated, STEP 1502. However, if the PAT$_{n-1}$ prediction was not correct, INQUIRY 1505, then an entry is installed in PAT$_n$ for this branch, PAT$_n$ anchor and ordinal, STEP 1507. Then, processing continues with STEP 1502.

Returning to INQUIRY 1504, if the pattern anchor table (PAT$_n$) entry is installed, then the pattern anchor table$_n$ entry including the saturation counter is updated, STEP 1506.

Further, the branch predictor determines whether the pattern anchor table (PAT$_n$) entry was in a strong state prior to being updated, INQUIRY 1508. If so, processing is complete. Otherwise, the pattern anchor table saturation counter in PAT$_{n-1}$ for this branch is also updated, STEP 1502.

One embodiment of the update logic when the PAT$_{n-1}$ override indicator is not set is described with reference to FIG. 16. Initially, a determination is made as to whether the PAT$_{n-1}$ entry is installed, INQUIRY 1600. If not, processing ends. Otherwise, the branch predictor determines whether the pattern anchor table override indicator for PAT$_{n-1}$ in the branch history table for the branch just executed is set, INQUIRY 1601. If so, then processing continues to STEP 1504 in FIG. 15. However, if the pattern anchor table override indicator for PAT$_{n-1}$ is not set, INQUIRY 1601, then the branch predictor further determines whether the prediction provided by the pattern anchor table (PAT$_{n-1}$) was correct, INQUIRY 1604. If it was correct, then the PAT$_{n-1}$ saturation counter is updated, STEP 1606. Otherwise, the pattern anchor table override indicator for PAT$_{n-1}$ in the branch history table for this branch is set (e.g., set to 1), STEP 1608, and an entry is installed in the pattern anchor table (PAT$_n$) for this branch (which is indexed by a combination of the branch anchor, the branch address and the branch ordinal), STEP 1610. In one embodiment, the saturation counter in the PAT$_n$ entry is set to weakly not taken. Further, in one embodiment, the saturation counter for PAT$_{n-1}$ is also updated, as described herein, STEP 1606.

Figure 17A:
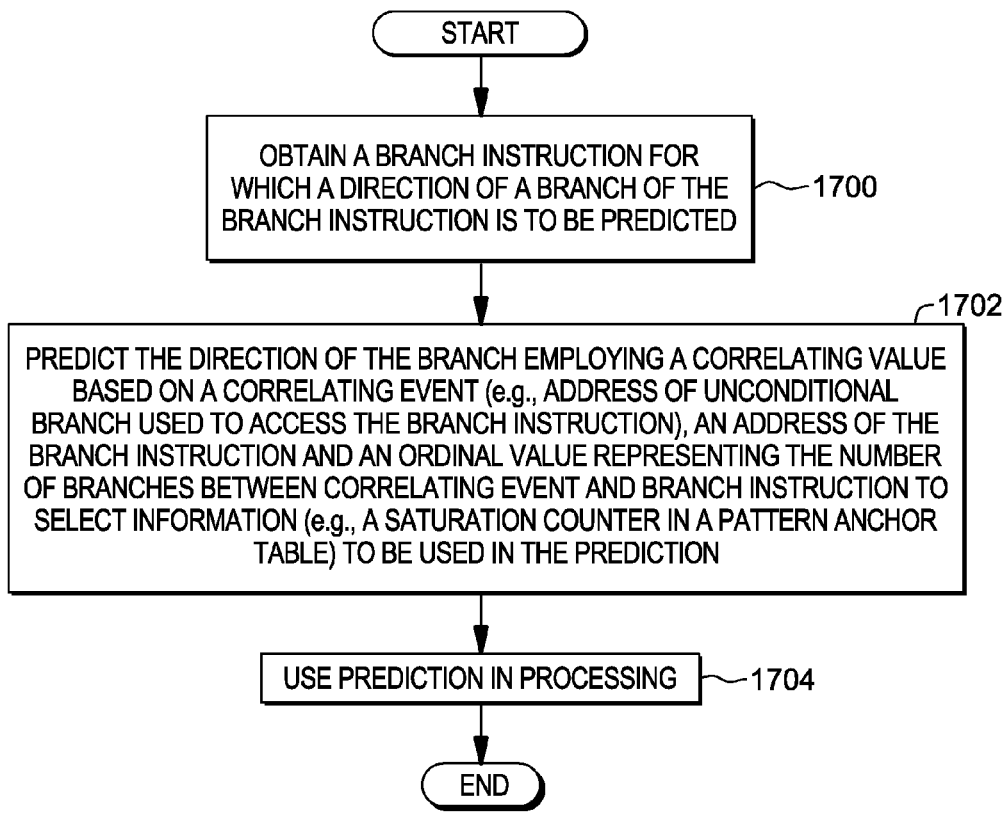
FIGS. 17A-17B depict one embodiment of an overview of using a pattern anchor table to predict branch direction.
Figure 17B:
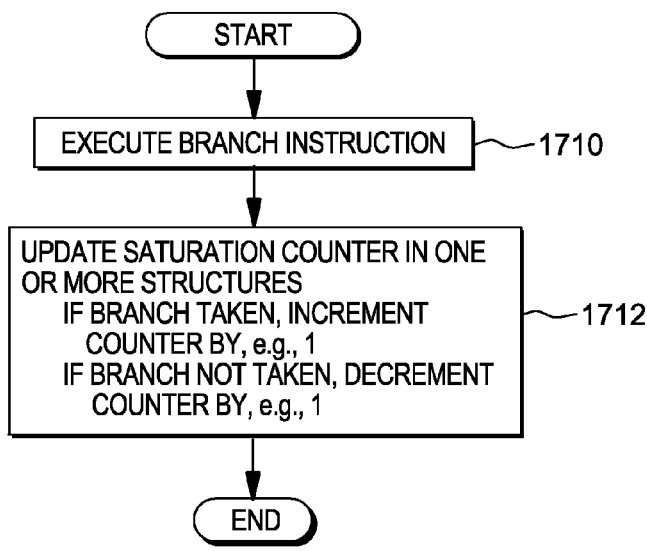

Described in detail herein is a branch prediction capability that uses at least one pattern anchor table for branch prediction. An overview of using such a structure is described with reference to FIGS. 17A-17B. In one embodiment, referring to FIG. 17A, a processor obtains a branch instruction for which a direction of a branch of the branch instruction is to be predicted, STEP 1700. The processor (e.g., a branch predictor of the processor) predicts the direction of the branch; i.e., whether the branch is to be taken or not taken, STEP 1702. This prediction employs, in one embodiment, a correlating value based on a correlating event (such as, e.g., an address of an unconditional branch used to access the branch instruction), an address of the branch instruction, and an ordinal value representing a number of branches between the correlating event (e.g., the unconditional branch) and the branch instruction to select information to be used in the predicting. The information selected is, for instance, a saturation counter located within a pattern anchor table, indexed by a function (e.g., XOR, concatenation) of the correlating value, the branch address and the ordinal value. Based on the information, the prediction is formed, and used in processing of an instruction stream that includes the branch instruction, STEP 1704.

Eventually, the branch instruction is executed, STEP 1710 (FIG. 17B), and one or more saturation counters are updated, STEP 1712. The saturation counters updated depend on the logic, as described above. However, if the branch is taken, then one or more saturation counters are incremented by, e.g., one; and if the branch was not taken, then one or more saturation counters are decremented by, e.g., one.

In one embodiment, a branch prediction capability is provided that uses a plurality of branch prediction tables to obtain predictions for branch direction, including one or more pattern anchor tables. Although various embodiments are described, other embodiments are also possible. A few of these possibilities are described below:

1. PHT Initialization
    PHT entries are initialized to a given state. Based on the exact design, this may be statically selected to be, for example: weakly not taken, weakly taken, or the direction outcome of the branch. In certain hardware designs, there is an advantage to be installed in a weakly not taken state. This minimizes the performance penalty in cases where a PHT entry converges to a taken state. However, in such a design, with a PAT active and an anchor set, the PHT can gain benefit, in one embodiment, by initializing new entries in a strong state that agrees with the branch direction actually taken.
2. PHT and BHT saturation counter update
    In one embodiment, the PHT/BHT updates to the saturation counters proceed regardless of whether the PAT was active, selected or not used.
3. PAT index predictee (the branch to be predicted) ordinal
    In one embodiment, the ordinal counter is implemented as a counter of a fixed bit length. As one example, an ordinal counter size of 16 bits is sufficient to avoid counter exhaustion. However, in most circumstances, PAT anchors are handled with a counter of 8-bits. Other sizes are possible.
    On exhaustion of the ordinal counter, a subroutine termination condition is generated, in one embodiment. However, a variation is to treat this condition as a subroutine start with the creation of a new PAT anchor.
    A further variation is to use the number of branches taken since establishment of a PAT anchor as the branch ordinal for the predictee. This would reduce the bit-space required for the ordinal counter without compromising the effectiveness of the PAT.
4. Simultaneous multiple predictions
    The branch ordinal count may represent the number of taken branches from the anchor to the branch being predicted (taken branch count instead of total branch count).

5. Use of a call return stack

On detection of a call instruction, the PAT anchor is established. If on detection of a subsequent call instruction, without the detection of a subroutine end condition, the current PAT-anchor is saved on a call stack and a new value is set for the nested subroutine, then a further benefit to the PAT scheme may be observed. On detection of subsequent calls, the current PAT anchor is saved and the new value is set. On detection of a subroutine end condition (not necessarily co-incident with the true end of the subroutine), the youngest entry on the call stack is restored to be the current PAT anchor. On emptying the call stack, a zero PAT anchor is set.

In embodiments, a stack depth of around 2 is used, up to around 16, although other depths may be used.

6. Use of multiple PATs

As described above, a PAT can be implemented in a recursive fashion: The PAT (which is referred to as PAT-0) serves to catch mispredictions from the PHT, a second PAT (PAT-1) may be implemented to catch mispredictions from the PAT-0, and so on to any level desired. The index for each of the PAT-n is formed as described above using an anchor, the predictee branch ordinal number relative to the PAT-0 anchor and location of the predictee branch. A call stack is maintained, and the entries are used concurrently to index each level of PAT, where PAT-0 uses the most current PAT anchor and PAT-1 uses the next oldest anchor etc. On detection of a subroutine end condition, the most current entry on the call stack is discarded.

Each PAT level is activated with an override indicator stored in the BHT. Thus, for a two-level PAT scheme, two override indicators are used, etc.

If a prediction is made from PAT-n and it is incorrect, then the override for PAT-n is set such that PAT-(n+1) is now activated.

Saturation counters for each PAT level are updated in canonical manner: if a level, say n, is referenced, then its counter is updated whether or not it is used. If that level is in a strong state, then no further update occurs (except possibly for the optimizations noted in 2 above). If that level is in a weak state, then level n−1 is updated. If level n−1 is in a weak state, then proceed to level n−2 and so on until all levels are examined or a strong state is encountered (i.e., the level from which the prediction was made) prior to update.

If PAT-n is active for a given branch, then it is true that PAT-(n−1) through PAT-0 are also active. An economy in bit space in the BHT may be to employ an encoding of the override to indicate the depth of override.

To facilitate the management of multiple PAT indices, a PAT Anchor Stack (PAS) is employed, in one embodiment:

Entries are pushed on to the PAS on detection of a correlation point such as a call to a subroutine;

Entries are popped from the PAS, if an anchor end condition detection is active;

When the PAS is full and a new entry is to be pushed onto the PAS, then the oldest entry is discarded;

Anchor end conditions are not necessarily co-incident with the true end of subroutine, but are points at which the applicability of a PAT anchor ceases to be current.

In a complex implementation that uses both anchor end detection and multiple PATs, then the PAS serves as a call return stack.

To avoid the proliferation of orphaned PATs, a single PAT may be implemented with multiple indices.

7. Certain branches are denoted as anchor points and these branches may be denoted in the BHT. In addition to denoting the branch as an anchor point, the accuracy of future branch predictions made with this as the anchor point may be recorded as a score. The score starts at some assigned value (either by a hardware default or under software control) upon installation into the BHT. For each correct prediction associated with the anchor, the anchor point maintained score is incremented by 1. For each incorrect branch prediction with the associated anchor point, the score of the anchor point is decremented by 1. When the score goes below a certain threshold, that branch is prevented from being recognized as an anchor point in the future. Further modification to the anchor accuracy scoring can be performed as to when to limit it from being an anchor. Such modification includes, e.g., being below the threshold for a given amount of time before preventing it from being an anchor in the future. Other variations are also possible.

In embodiments described herein, a subroutine is used as the vehicle to which a PAT is applied. However, any contiguous segment of code execution, delimited by conditions determinable by the processor, may have a PAT scheme applied to it.

Although a number of embodiments, aspects, etc. are described herein, others are also possible and included within the spirit of one or more aspects of the present invention. Further, although certain processing may be described sequentially, one or more aspects of such processing may be performed in parallel (e.g., multiple tables may be accessed/processed in parallel, etc.).

Described in detail herein is a prediction technique that overall uses fewer tables than previous techniques and hence less power; learns faster; and is more efficient, since it does not require entries for all of the unique entries that are created by the don't care branch outcomes. Such a solution yields, for instance, higher performance for less power, and greater performance at the same power.

In one embodiment, both the pattern history table and the pattern anchor table are leveraged. The pattern history table covers local pattern behavior and the pattern anchor table covers global pattern behaviors which are associated/anchored to a given point in time. In one embodiment, this design yields greater performance for the same budget (area, power, complexity) and equal performance for a lower budget.

Figure 18:
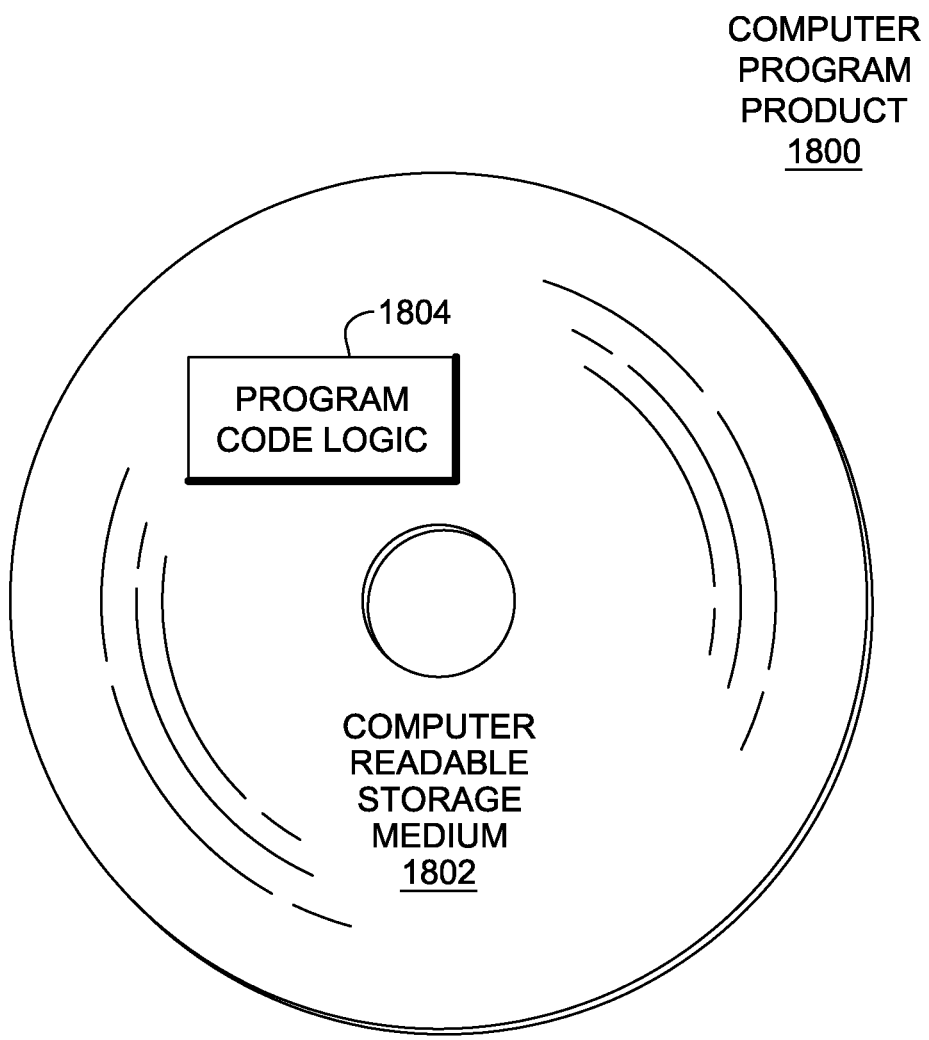
FIG. 18 depicts one embodiment of a computer program product.

Referring to FIG. 18, in one example, a computer program product 1800 includes, for instance, one or more non-transitory computer readable storage media 1802 to store computer readable program code means, logic and/or instructions 1804 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, types of structures other than tables may be used and/or the number of tables used may differ. Further, other types of correlating values and/or points may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 19:
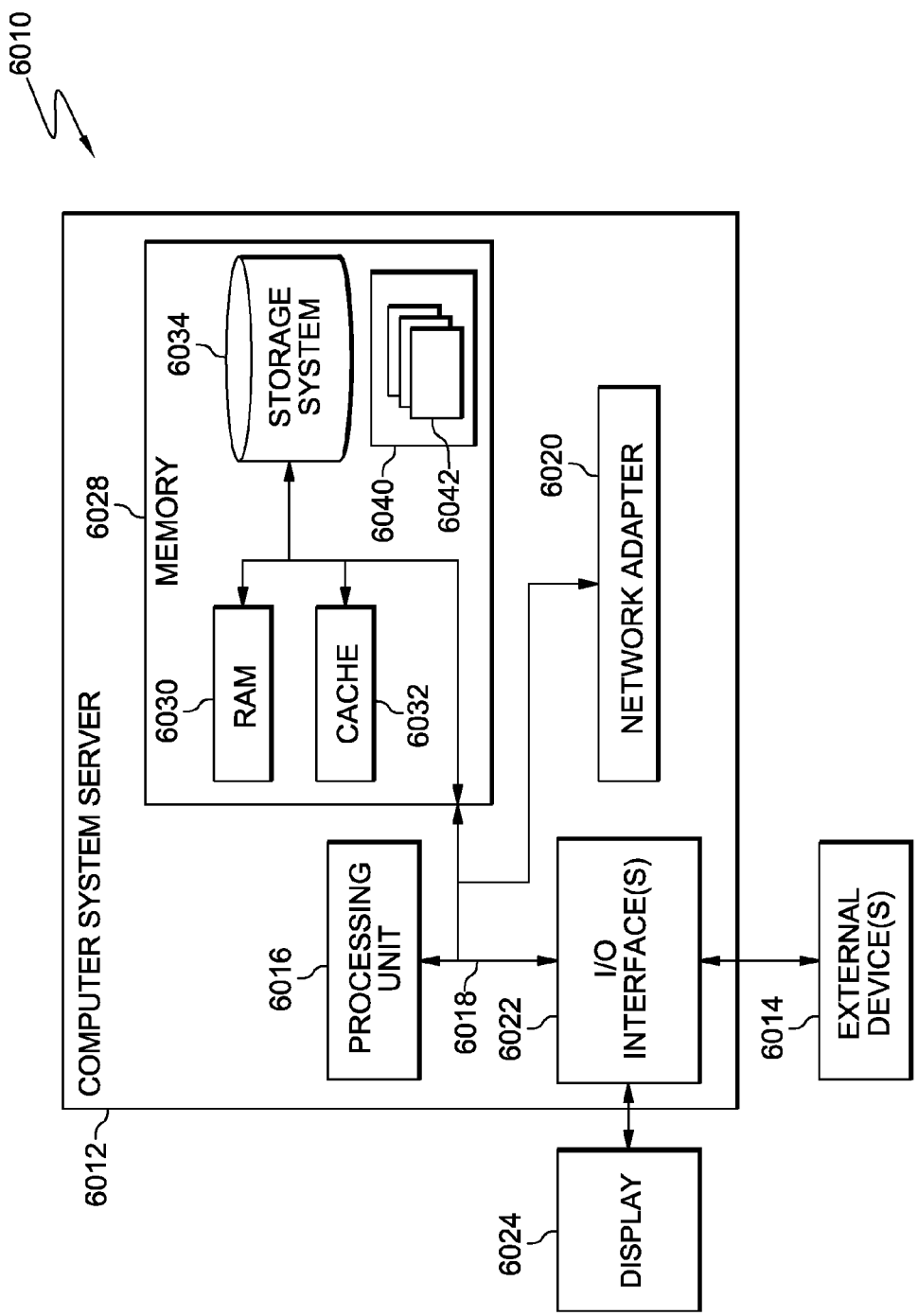
FIG. 19 depicts one embodiment of a cloud computing node.

Referring now to FIG. 19, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples, include, but are not limited to: microcode, device drivers, redundant processing units, external disk drive arrays, RAID systems, tape drives, and data archival storage systems, etc.

Figure 20:
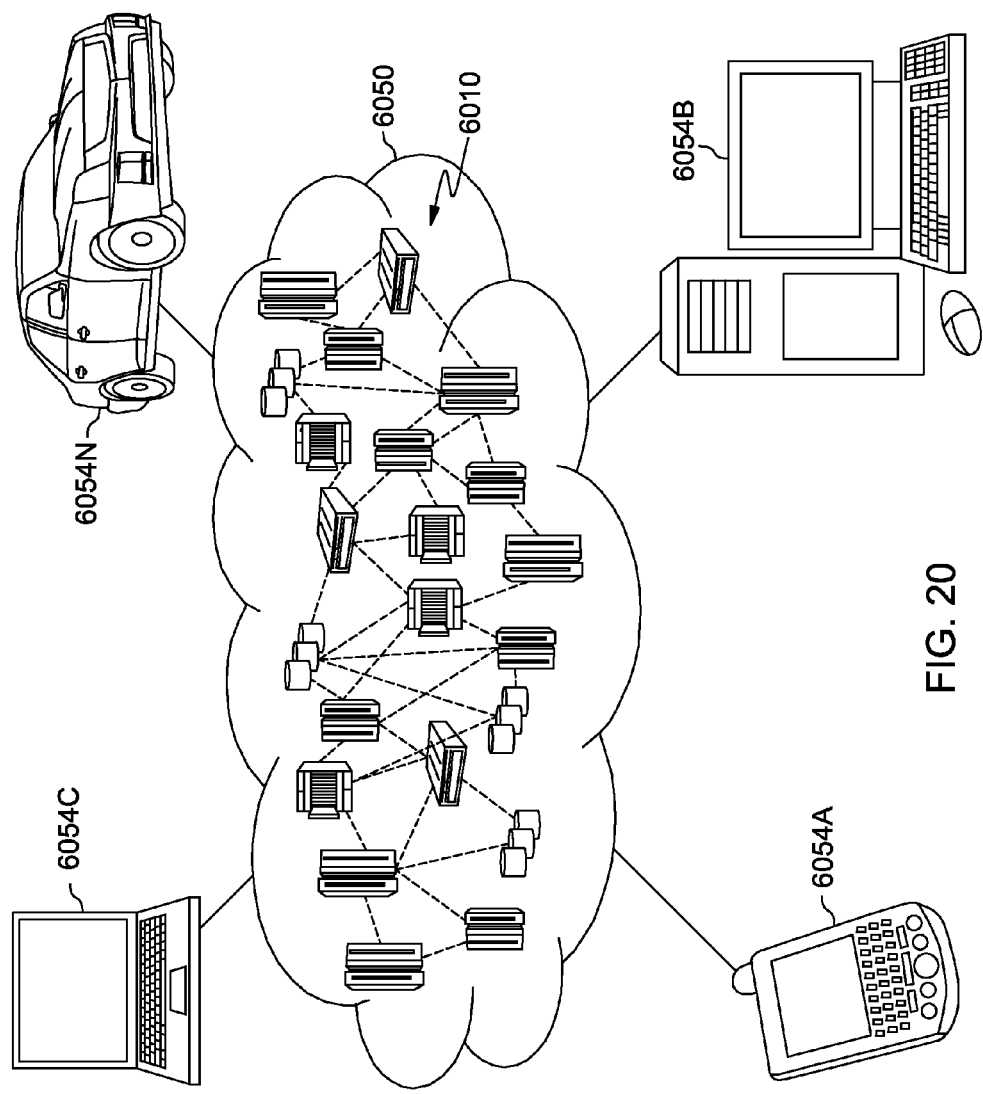
FIG. 20 depicts on embodiment of a cloud computing environment.

Referring now to FIG. 20, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 20 are intended to be illustrative only and that computing nodes 6010 and cloud computing environment 6050 can communicate with any type of computerized device over any type of network and/or network addressable connection (e.g., using a web browser).

Figure 21:
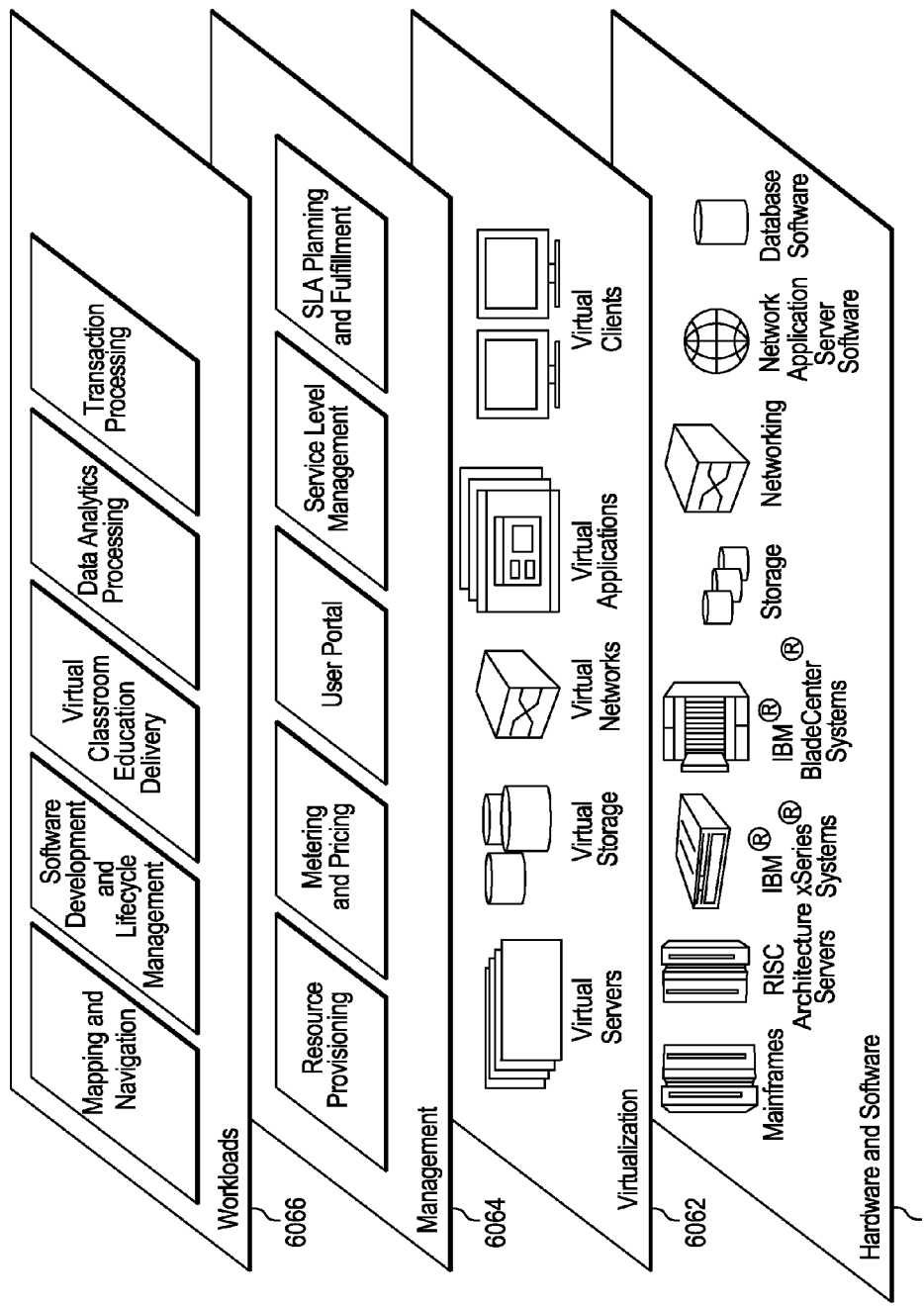
FIG. 21 depicts one example of abstraction model layers.

Referring now to FIG. 21, a set of functional abstraction layers provided by cloud computing environment 6050 (FIG. 20) is shown. It should be understood in advance that the components, layers, and functions shown in FIG. 21 are intended to be illustrative only and embodiments of the invention are not limited thereto. As depicted, the following layers and corresponding functions are provided:

Hardware and software layer 6060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 6062 provides an abstraction layer from which the following examples of virtual entities may be provided: virtual servers; virtual storage; virtual networks, including virtual private networks; virtual applications and operating systems; and virtual clients.

In one example, management layer 6064 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 6066 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of predicting direction of branches, said method comprising:
   obtaining, by a processor of a computing environment, a branch instruction for which a direction of a branch of the branch instruction is to be predicted; and
   predicting, by the processor, the direction of the branch, the predicting employing a correlating value, an address of the branch instruction, and a value representing a number of selected branches between a correlating event and the branch instruction to select information to be used in the predicting, the correlating event being an event different from the branch instruction and configured to affect a direction of a flow of code that includes the correlating event, and the correlating value being based on an occurrence of the correlating event used to obtain the branch instruction, wherein the employing comprises using the correlating value, the address of the branch instruction, and the value representing the number of selected branches to generate an index, the index to be used to index into a structure to select an entry including the information to be used in the predicting.

2. The method of claim 1, wherein the correlating event is an unconditional branch used to access the branch instruction, and the correlating value is an address of the unconditional branch.

3. The method of claim 1, wherein the correlating event is a subroutine call to a routine that includes the branch instruction.

4. The method of claim 1, further comprising determining whether the entry is to be used, the determining whether the entry is to be used comprises using an address tag field of the entry to determine whether the entry is for the branch.

5. The method of claim 1, wherein the information includes a saturation counter to be used in the predicting.

6. The method of claim 5, further comprising:
   determining, based on the saturation counter, whether the direction of the branch is to be predicted using the saturation counter of the structure; and
   based on determining that the direction of the branch is not to be predicted using the saturation counter of the structure, selecting another structure to be used in the predicting.

7. The method of claim 6, wherein the another structure is of a same type as the structure, wherein the index into the another structure is formed based on the correlating value, the address of the branch, and the value.

8. The method of claim 6, wherein the another structure is of a different type from the structure, wherein the index into the another structure is formed based on the address of the branch or based on the address of the branch and a branch history.

9. The method of claim 5, further comprising:
executing the branch instruction; and
updating the saturation counter, based on execution of the branch instruction.

\* \* \* \* \*